(12) United States Patent
Sugaya et al.

(10) Patent No.: US 11,375,400 B2
(45) Date of Patent: Jun. 28, 2022

(54) WIRELESS COMMUNICATION APPARATUS AND METHOD FOR GENERATING MIDAMBLE AND CONTROLLING TRANSMISSION POWER

(71) Applicant: Sony Corporation, Tokyo (JP)

(72) Inventors: Shigeru Sugaya, Kanagawa (JP); Ren Sugai, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 263 days.

(21) Appl. No.: 16/624,299

(22) PCT Filed: Jun. 22, 2018

(86) PCT No.: PCT/JP2018/023766
§ 371 (c)(1),
(2) Date: Dec. 19, 2019

(87) PCT Pub. No.: WO2019/009099
PCT Pub. Date: Jan. 10, 2019

(65) Prior Publication Data
US 2020/0178120 A1   Jun. 4, 2020

(30) Foreign Application Priority Data

Jul. 6, 2017   (JP) .............................. JP2017-132694

(51) Int. Cl.
*H04L 69/22*   (2022.01)
*H04W 28/06*   (2009.01)
(Continued)

(52) U.S. Cl.
CPC ......... *H04W 28/06* (2013.01); *H04L 27/2613* (2013.01); *H04L 69/22* (2013.01);
(Continued)

(58) Field of Classification Search
CPC . H04B 7/0684; H04L 1/0079; H04L 27/2692; H04W 52/16; H04W 52/30; H04J 29/51
See application file for complete search history.

(56) References Cited

U.S. PATENT DOCUMENTS 8,462,863 B1 * 6/2013 Zhang ................. H04L 27/2613
375/285
2008/0056166 A1    3/2008 Suzuki et al.
(Continued)

FOREIGN PATENT DOCUMENTS

JP      2006-033227 A    2/2006
JP      2014-512156 A    5/2014
(Continued)

OTHER PUBLICATIONS

Extended European Search Report dated May 15, 2020 in European Application No. 18828744.5.
(Continued)

*Primary Examiner* — Salvador E Rivas
(74) *Attorney, Agent, or Firm* — Xsensus, LLP

(57) ABSTRACT

The present technology relates to a wireless communication apparatus and method by which communication can be performed with a higher efficiency.
The wireless communication apparatus includes a preamble generation section that generates a preamble that is to be deployed at the top of a transmission frame and includes header information, a midamble generation section that generates a midamble that is to be deployed in the middle of the transmission frame and includes information of at least part of the header information, and a wireless transmission processing section that transmits the transmission frame including the preamble and the midamble. The present technology can be applied to a wireless communication apparatus.

20 Claims, 23 Drawing Sheets

(51) Int. Cl.

| | | |
|---|---|---|
| *H04L 27/26* | (2006.01) | |
| *H04W 72/04* | (2009.01) | |
| *H04W 74/08* | (2009.01) | |
| *H04W 52/16* | (2009.01) | |
| *H04W 52/30* | (2009.01) | |
| *H01J 29/51* | (2006.01) | |

(52) U.S. Cl.
CPC ....... *H04W 52/16* (2013.01); *H04W 72/0446* (2013.01); *H04W 74/0808* (2013.01); *H01J 29/51* (2013.01); *H04W 52/30* (2013.01)

(56) References Cited

U.S. PATENT DOCUMENTS

| | | |
|---|---|---|
| 2012/0263084 A1 | 10/2012 | Liu et al. |
| 2012/0281682 A1* | 11/2012 | Chin .................... H04W 56/00 370/336 |
| 2012/0314636 A1 | 12/2012 | Liu |
| 2013/0016642 A1 | 1/2013 | Banerjea et al. |
| 2013/0051260 A1* | 2/2013 | Liu .................... H04L 27/2613 370/252 |
| 2013/0279379 A1 | 10/2013 | Yang |
| 2015/0327120 A1 | 11/2015 | Liu |
| 2016/0142980 A1 | 5/2016 | Lee |
| 2016/0345266 A1 | 11/2016 | Park |
| 2017/0181102 A1 | 6/2017 | Bharadwaj et al. |
| 2021/0037570 A1* | 2/2021 | Sugaya .................... H04L 69/22 |

FOREIGN PATENT DOCUMENTS

| | | |
|---|---|---|
| JP | 2014-522610 A | 9/2014 |
| JP | 2014-525714 A | 9/2014 |
| JP | 2015-507889 A | 3/2015 |
| RU | 2479928 C2 | 4/2013 |

OTHER PUBLICATIONS

International Search Report and Written Opinion dated Aug. 28, 2018 for PCT/JP2018/023766 filed on Jun. 22, 2018, 14 pages including English Translation of the International Search Report.

* cited by examiner

FIG. 5

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| RATE | | | | R | LENGTH | | | | | | | | | | | | P | Tail | | | | | |

L-SIG

FIG. 6

| HE-SIG-A1 HE SU PPDU/HE extended range SU PPDU | | HE-SIG-A2 HE SU PPDU/HE extended range SU PPDU | |
|---|---|---|---|
| 0 | Format | 0 | TXOP Duration |
| 1 | Beam Change | 1 | |
| 2 | UL/DL | 2 | |
| 3 | MCS | 3 | |
| 4 | | 4 | |
| 5 | | 5 | |
| 6 | | 6 | |
| 7 | DCM | 7 | Coding |
| 8 | BSS Color | 8 | LDPC Extra Sym |
| 9 | | 9 | STBC |
| 10 | | 10 | Tx BF |
| 11 | | 11 | Pre-FEC Padding Factor |
| 12 | | 12 | |
| 13 | | 13 | PE Disambiguity |
| 14 | Reserved | 14 | Reserved |
| 15 | Spatial Reuse | 15 | Doppler |
| 16 | | 16 | CRC |
| 17 | | 17 | |
| 18 | | 18 | |
| 19 | Bandwidth | 19 | |
| 20 | | 20 | |
| 21 | GI+TF Size | 21 | Tail |
| 22 | | 22 | |
| 23 | | 23 | |
| 24 | Nsts | 24 | |
| 25 | | 25 | |

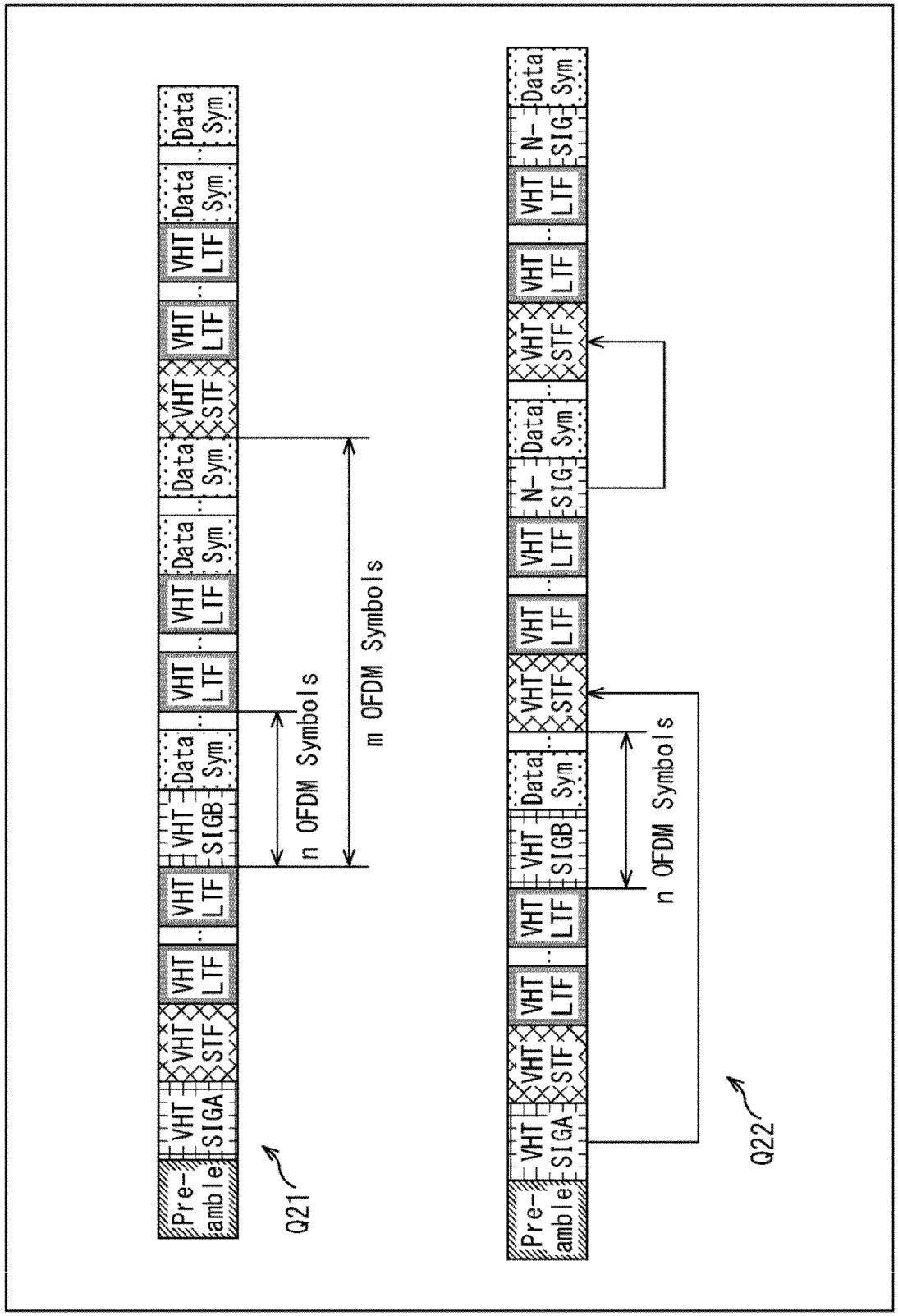
F I G. 9

FIG. 15

Mid-SIG_1

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| Rate (Reserved) | | | | R | | | | Remaining Duration (Length) | | | | | | | | P | | TPC Level | | | | Number of HE-LTF | |

Mid-SIG_2

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|----|----|----|----|----|----|----|----|----|----|----|----|----|----|
| MCS Parameter | | | | Spatial Reuse | | | | BSS Color | | | | | | | | CRC | | | | Tail | | | |

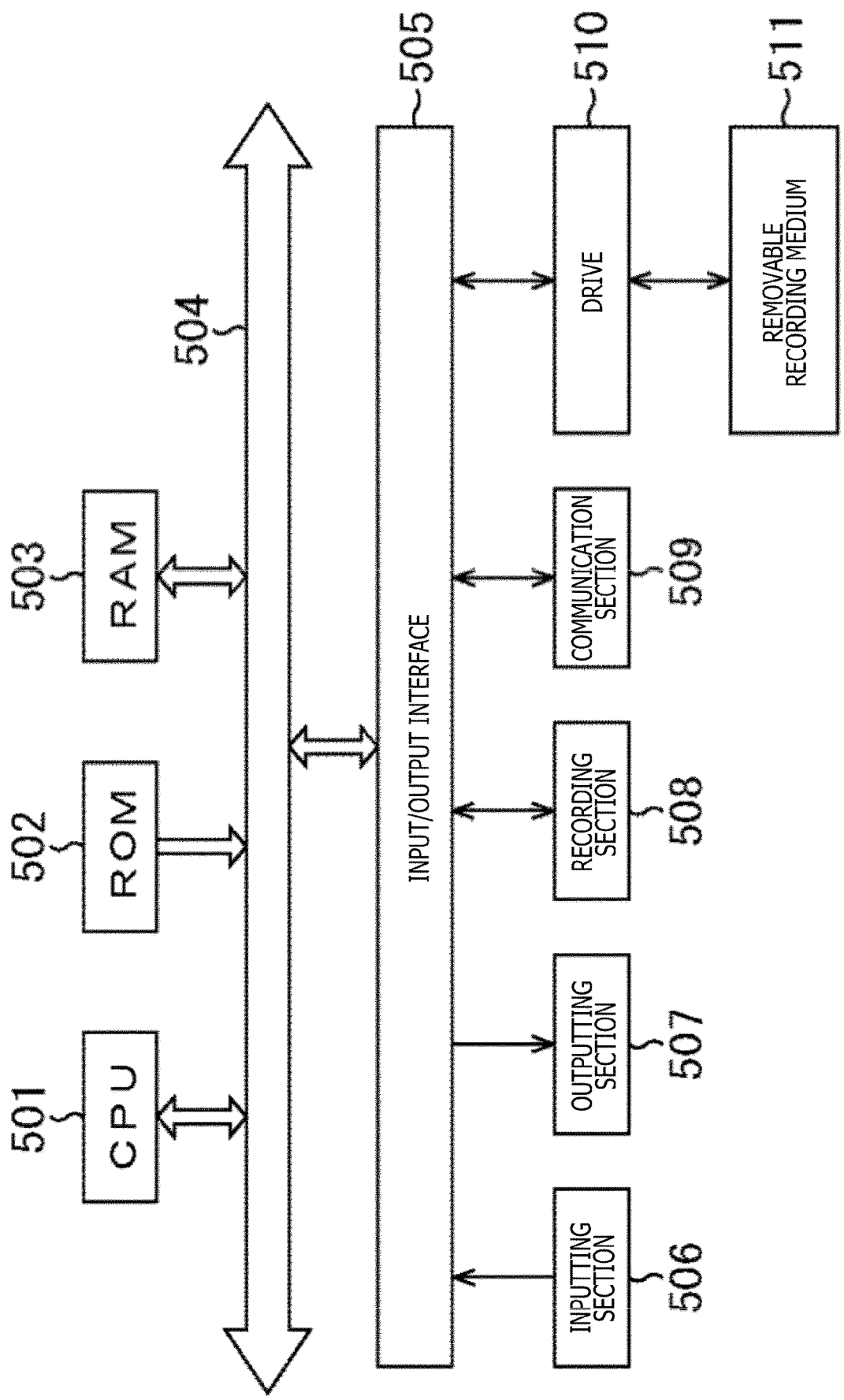

WIRELESS COMMUNICATION APPARATUS AND METHOD FOR GENERATING MIDAMBLE AND CONTROLLING TRANSMISSION POWER

CROSS-REFERENCE TO RELATED APPLICATIONS

The present application is based on PCT filing PCT/JP2018/023766, filed Jun. 22, 2018, which claims priority to JP 2017-132694, filed Jul. 6, 2017, the entire contents of each are incorporated herein by reference.

TECHNICAL FIELD

The present technology relates to a wireless communication apparatus and method, and particularly to a wireless communication apparatus and method by which communication can be performed with a higher efficiency.

BACKGROUND ART

In recent years, research and development of a high density wireless LAN (Local Area Network) system have been and are being done, and methods for applying an advanced space reuse (Spatial Reuse) technology that increases the capacity of existing wireless LAN terminals to implement a high throughput have been invented.

Among such methods, as an advanced space reuse (Spatial Reuse) technology, a technology has been invented which allows coexistence of a signal of a basic service set (BSS (Basis Service Set)) of a wireless communication apparatus itself and a signal from an overlap basic service set (OBSS (Overlapping Basic Service Set)) existing in the neighborhood of the wireless communication apparatus itself. In particular, for example, a communication method has been invented which carries out, if a signal from an OBSS neighboring with a wireless communication apparatus itself has a predetermined reception electric field strength (reception power) or less, then transmission of a signal of the wireless communication apparatus itself within a range within which the transmission does not have an influence on the OBSS.

Further, a technology is generally known which inserts a midamble for resynchronization in the middle of a frame of transmission data to correct a phase, a frequency error and so forth of the frame configured from a long information amount.

As such a technology as just described, a technology is available by which, for example, an MSDU (MAC (Media Access Control) Service Data Unit) into MPDUs (MAC Protocol Data Units) determined in advance and a sub frame to which a PHY (Physical layer) preamble is added is deployed at the top MPDU while, to each succeeding MPDU, a sub frame to which a midamble is added is configured to perform data transmission (for example, refer to PTL 1).

Also a technology has been proposed by which a training field is added to each n OFDM (Orthogonal Frequency Division Multiplexing) symbols to configure successive frames (for example, refer to PTL 2). In this technology, the training field part is a midamble.

The technologies mentioned adopt a configuration that a training field is deployed for each n OFDM symbols determined in advance.

Further, the technologies adopt a configuration that a single VHT SIG-A field that is added to the preceding stage to the training field is deployed at the succeeding stage and only one VHT SIG-B field that is added to the succeeding stage of the training field is deployed only at the top portion, and they are accommodated in n OFDM symbols.

Also technologies have been disclosed that, from among training fields, a training field of a LTF (Long Training Field) is deployed for each n OFDM symbols and training fields of another STF (Short Training Field) and a LTF are added for each m OFDM symbols where m is an integer multiple of n.

Among the technologies, also a technology has been disclosed that a training field and signaling called N-SIG are added to notify an OFDM symbol number to a next training field.

As described above, in the past, a configuration for adding a midamble for each predetermined OFDM symbols has been used.

CITATION LIST

Patent Literature

[PTL 1]
JP 2014-522610T
[PTL 2]
JP 2015-507889T

SUMMARY

Technical Problems

However, it is difficult for the technologies described above to perform communication efficiently.

In particular, in the case where the advanced space reuse technology is applied, it is prescribed that, even if a signal from a neighboring OBSS is received, a BSS can perform transmission of data. Therefore, in the case where a signal in the BSS is being received, a state in which it becomes less likely to grasp a utilization situation of a transmission line due to signal transmission from a neighboring OBSS is established and, on the contrary, it becomes difficult to perform communication in the BSS of the wireless communication apparatus itself.

In particular, since, during transmission of a frame toward the inside of the BSS of the wireless communication apparatus itself, also signal transmission from the different OBSS is started, it is difficult to specify whether the transmission line is being utilized after frame transmission in the BSS of the wireless communication apparatus itself comes to an end.

Further, even in the case where a signal level equal to or higher than a predetermined reception electric field strength (reception power) is detected in regard to a received signal, if the signal is not received beginning with the header part, then it cannot be decided whether the signal is a signal from an OBSS or a signal from within the BSS.

If it cannot be decided whether the received signal is a signal from within the BSS of the wireless communication apparatus itself or a signal from an OBSS, then it cannot be decided whether or not it is possible to perform multiplex transmission applying the advanced space reuse technology and advanced space reuse cannot be performed efficiently. In short, communication cannot be performed efficiently.

Further, even if a signal is detected in the middle of a frame, since information indicative of the duration (Duration) of the signal cannot be obtained, reception end time of the frame cannot be grasped. Accordingly, in order to start new signal transmission after an end of a frame detected, detection of the signal level must always be continued.

In the related art configuration that a midamble or a training field is inserted in the middle of a frame, since information of the header part is deployed only at the top of a frame, if the top of the frame cannot be decoded correctly, then the header information cannot be grasped. This makes it impossible to decide whether a frame being received is a signal from an OBSS or a signal from within the BSS.

The present technology has been made in view of such a situation as described above and makes it possible to perform communication with a higher efficiency.

Solution to Problems

A wireless communication apparatus of a first aspect of the present technology includes a preamble generation section configured to generate a preamble that is to be deployed at a top of a transmission frame and includes header information, a midamble generation section configured to generate a midamble that is to be deployed in a middle of the transmission frame and includes information of at least part of the header information, and a wireless transmission processing section configured to transmit the transmission frame including the preamble and the midamble.

A wireless communication method of the first aspect of the present technology includes the steps of generating a preamble that is to be deployed at a top of a transmission frame and includes header information, generating a midamble that is to be deployed in a middle of the transmission frame and includes information of at least part of the header information, and transmitting the transmission frame including the preamble and the midamble.

In the first aspect of the present technology, a preamble that is to be deployed at the top of a transmission frame and includes header information is generated, and a midamble that is to be deployed in the middle of the transmission frame and includes information of at least part of the header information is generated. Then, the transmission frame including the preamble and the midamble is transmitted.

A wireless communication apparatus according to a second aspect of the present technology includes a wireless reception processing section configured to receive a reception frame that includes a preamble deployed at a top of the reception frame and including header information and a midamble deployed in a middle of the frame and including information of at least part of the header information, and a midamble detection section configured to detect the midamble from the reception frame and extract the information of the at least part of the header information included in the midamble.

A wireless communication method according to the second aspect of the present technology includes the steps of receiving a reception frame that includes a preamble deployed at a top of the reception frame and including header information and a midamble deployed in a middle of the frame and including information of at least part of the header information, and detecting the midamble from the reception frame and extracting the information of the at least part of the header information included in the midamble.

In the second aspect of the present technology, a reception frame that includes a preamble deployed at the top of the reception frame and including header information and a midamble deployed in the middle of the frame and including information of at least part of the header information is received, and the midamble is detected from the reception frame. Then, the information of the at least part of the header information included in the midamble is extracted.

Advantageous Effect of Invention

According to the first aspect and the second aspect of the present technology, communication can be performed with a high efficiency.

It is to be noted that the effect described here is not necessarily restrictive, and some effects indicated in the present disclosure may be applicable.

BRIEF DESCRIPTION OF DRAWINGS

FIG. 5 is a view depicting a configuration example of L-SIG.

FIG. 6 is a view depicting a configuration example of HE-SIG-A.

FIG. 9 is a view depicting configuration examples of a transmission frame in which a midamble is inserted.

FIG. 15 is a view depicting a configuration example of HE MID.

FIG. 23 is a view depicting a configuration example of computer.

DESCRIPTION OF EMBODIMENTS

In the following, embodiments to which the present technology is applied are described with reference to the drawings.

First Embodiment

<Configuration Example of Wireless Network>

The present technology makes it possible to carry out appropriate transmission control by performing signal transmission in a signal format that makes it possible, even in the case where a signal transmitted by wireless communication is detected from the middle of a frame, parameters in header information described in the preamble can be specified such that the parameters can be specified. Consequently, communication can be carried out with a higher efficiency.

In particular, a midamble to be inserted in the middle of a frame is configured so as to include part of header information such that, on the reception side, in the case where the midamble is detected, header information included in the midamble can be extracted by decoding, for example, the first OFDM midamble immediately after the detection.

The header information includes, for example, BSS Color information for identifying the BSS, parameters relating to an advanced space reuse technology (Spatial Reuse), information indicative of a state of transmission power controlling operation and so forth, and the reception side of the signal can perform appropriate decision from the information mentioned.

Further, in the header information, parameters of information of a modulation method and an encoding scheme (MCS (Modulation and Coding Scheme)), information of the remaining time and the data length of a frame (Length) and so forth may be suitably deployed in the data part.

Furthermore, a midamble may be deployed in a unit of a MAC Protocol Data Unit (MPDU), namely, in a unit of a sub frame, such that the necessity for performing a padding process at the tail end of an MPDU is eliminated also when aggregation is carried out with a plurality of MPDUs.

Since this makes it possible to perform decoding in a unit of a sub frame beginning with the middle of a frame even in the case where MPDU aggregation is carried out, even if header information at the preamble part is missed, the header information can be received from a middle one of the MPDUs.

Figure 1:
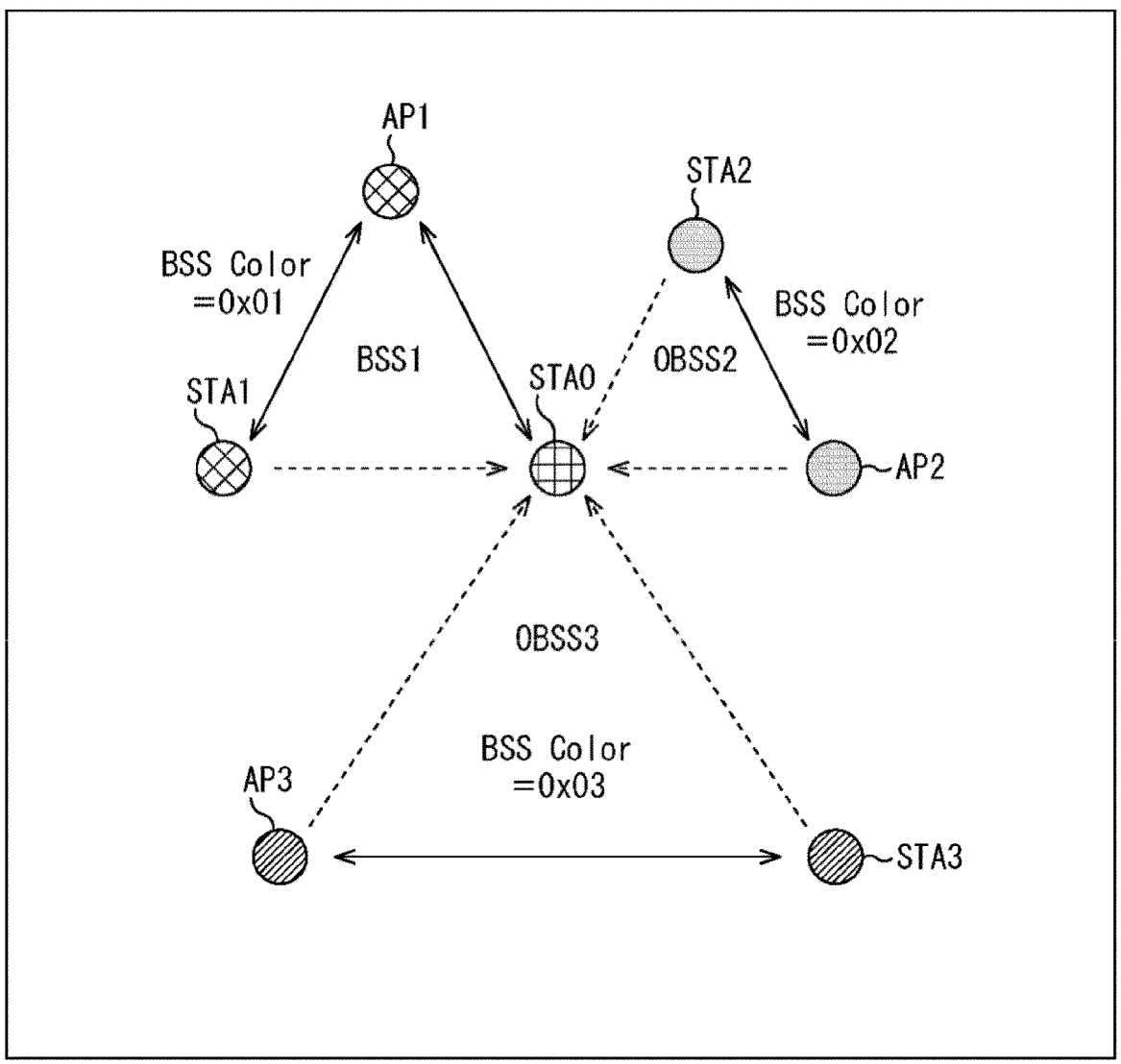
FIG. 1 is a view depicting a configuration example of a wireless network.

In the following, a particular embodiment in which the present technology is applied is described. FIG. 1 is a view depicting a configuration example of a wireless network including a wireless communication apparatus to which the present technology is applied.

In the example depicted in FIG. 1, a relationship between a wireless communication apparatus to which the present technology is applied and wireless communication apparatus existing around the wireless communication apparatus is depicted.

In particular, a wireless communication apparatus STA0 cooperates with an access point AP1 of a first basic service set to which the wireless communication apparatus STA0 itself belongs, namely, of the BSS (hereinafter referred to as BSS 1) and a different wireless communication apparatus STA1 to establish a wireless network to carry out communication.

In other words, to the BSS 1 that is a wireless network, the wireless communication apparatus STA0, access point AP1, and wireless communication apparatus STA1 belong, and they configure a wireless communication system.

In the present example, whether a detected signal is a signal transmitted from an apparatus that configures the BSS 1 can be specified from BSS Color information=0x01 indicative of the BSS 1 included in the signal. The BSS Color information is information for specifying a wireless network to which an apparatus of a transmission source of the signal in which the BSS Color signal is included belongs.

Further, around the wireless communication apparatus STA0, also an access point AP2 of a second BSS (hereinafter referred to as OBSS 2) that exists around the wireless communication apparatus STA0 and overlaps with the BSS 1 and a wireless communication apparatus STA2 exist. Here, whether a detected signal has been transmitted from an apparatus that configures the OBSS 2 can be specified from BSS color information=0x02 that is included in the signal and indicates the OBSS 2.

Furthermore, around the wireless communication apparatus STA0, also an access point AP3 of a third BSS (hereinafter referred to as the OBSS 3) that exists around the wireless communication apparatus STA0 and overlaps with the BSS 1 and a wireless communication apparatus STA3 exist. Here, whether a detected signal has been transmitted from an apparatus that configures the OBSS 3 can be specified from BSS color information=0x03 that indicates the OBSS 3 included in the signal.

In the case where the OBSS 2 or the OBSS 3 having a communicatable range overlapping with that of the BSS 1 exists in such a manner, for example, the wireless communication apparatus STA0 detects not only a signal transmitted from the access point AP1 or the wireless communication apparatus STA1 configuring the BSS 1 but also a signal transmitted from such an apparatus as the access point AP2, the wireless communication apparatus STA2, the access point AP3, or the wireless communication apparatus STA3.

Each of the BSSes including the BSS 1, the OBSS 2, and the OBSS 3 is configured such that it carries out transmission power control to perform communication in response to a situation between the apparatus that configure the BSS.

For example, in the OBSS 2 configured from the access point AP2 and the wireless communication apparatus STA2 in which the communication situation is better than that in the BSS 1, communication is performed with transmission power reduced. Further, in the OBSS 3 in which the access point AP3 and the wireless communication apparatus STA3 in which the communication situation is worse than that in the BSS 1, communication is performed with transmission power increased.

In short, each BSS is configured such that transmission power control according to the apparatus that configure the wireless network (BSS) is carried out. Therefore, since communication is not carried out with predetermined transmission power as before and whether or not a transmission line is utilized cannot be determined uniquely from the reception electric field strength (reception power) of the received signal, it is difficult to carry out transmission control by CSMA/CA (Carrier Sense Multiple Access/Collision Avoidance).

Further, in recent years, it has been conceived to improve the utilization efficiency of a wireless transmission line by performing the advanced space reuse technology, for example, upon communication between the access point AP3 and the wireless communication apparatus STA3 of the OBSS 3, communication in which the transmission power from the wireless communication apparatus STA0 to the access point AP1 is controlled is performed so as not to have an influence on the communication.

In short, each BSS is configured such that it carries out advanced space reuse by carrying out communication in the BSS of the wireless communication apparatus itself and unrelated communication of an overlapping BSS (OBSS) in an overlapping relationship with each other.

However, if communication from the wireless communication apparatus STA0 to the access point AP1 is carried out, then since this has a big influence on communication between the access point AP2 and the wireless communication apparatus STA2 of the OBSS 2 that are communicating with each other with transmission power of the wireless communication apparatus itself, control for refraining from transmission is required.

<Configuration Example of Wireless Communication Apparatus>

Now, a configuration of the apparatus configuring the BSSes depicted in FIG. 1 is described.

Figure 2:
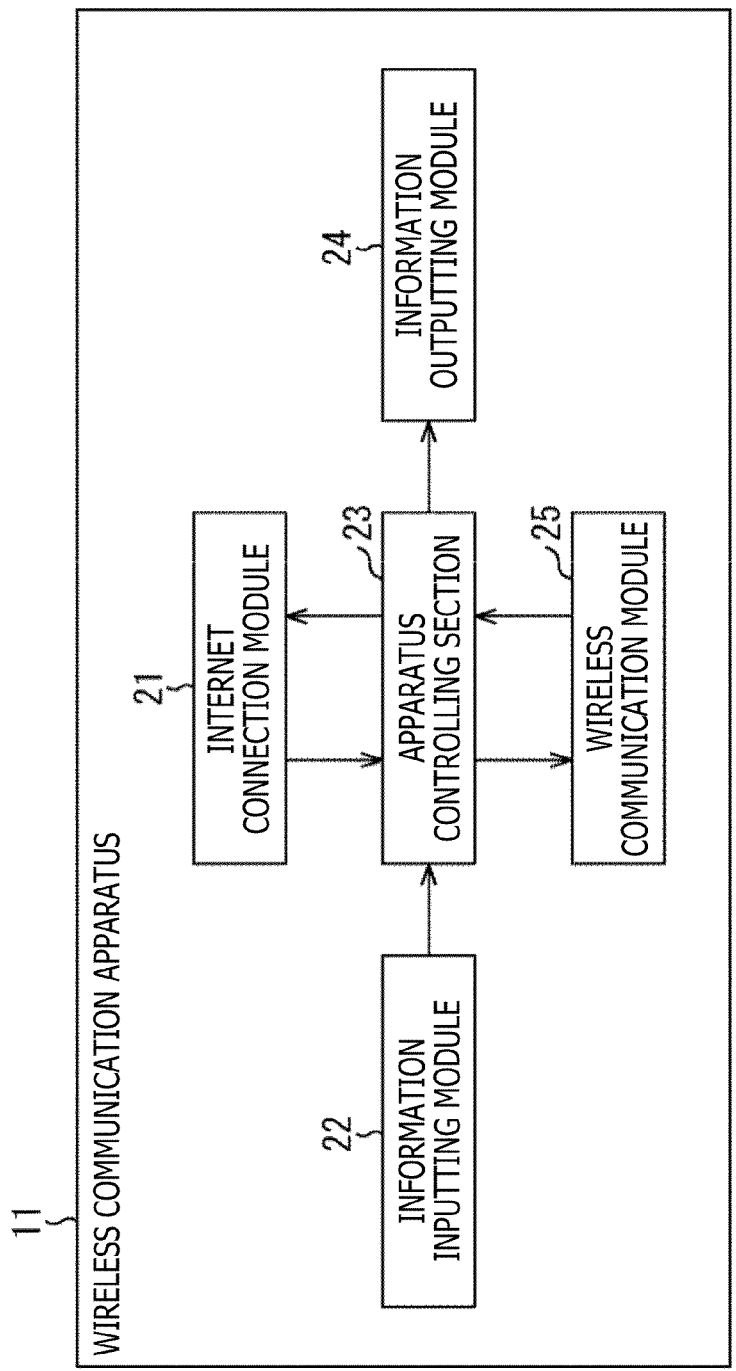
FIG. 2 is a view depicting a configuration example of a wireless communication apparatus.

FIG. 2 is a view depicting a configuration example of a wireless communication apparatus to which the present technology is applied.

A wireless communication apparatus 11 depicted in FIG. 2 corresponds to such apparatus as, for example, the wireless communication apparatus STA0, the wireless communication apparatus STA1, and the access point AP1 that configure the BSS 1 depicted in FIG. 1.

It is to be noted that the description here is given assuming that the wireless communication apparatus 11 is configured such that it can operate as any of an access point such as the access point AP1 and a communication device such as the wireless communication apparatus STA0, which configure the BSS, namely, the wireless LAN system. However, the wireless communication apparatus 11 may naturally be configured such that components unnecessary for individual operations are omitted as occasion demands.

The wireless communication apparatus 11 includes, for example, an Internet connection module 21, an information inputting module 22, an apparatus controlling section 23, an information outputting module 24, and a wireless communication module 25.

The Internet connection module 21 functions as an adapter that is connected by wire connection to the Internet network, for example, when the wireless communication apparatus 11 operates as an access point. In particular, the Internet connection module 21 supplies data received through the Internet network to the apparatus controlling section 23 and transmits data supplied from the apparatus controlling section 23 to a communication partner through the Internet.

The information inputting module 22 acquires, in the case where, for example, a button or the like is operated by a user to input an operation desired by the user, a signal according to the operation of the user and supplies the signal to the apparatus controlling section 23. For example, in the case where various buttons and switches, a touch panel, a mouse, a keyboard and so forth are operated by the user, or in the case where the user performs an inputting operation with voice or the like to a microphone or the like, the information inputting module 22 decides such operation input and acquires a signal supplied in response to the operation.

The apparatus controlling section 23 controls operation of the overall wireless communication apparatus 11 in response to a signal or the like supplied from the information inputting module 22. In particular, the apparatus controlling section 23 includes a CPU (Central Processing Unit) that centrally manages control of operation of the wireless communication apparatus 11 and executes arithmetic processing, blocks for implementing functions corresponding to an OS (Operating System) and so forth.

For example, the apparatus controlling section 23 supplies predetermined data to the wireless communication module 25 so as to transmit the data to a communication partner by wireless communication and acquires data received from the communication partner from the wireless communication module 25. Further, the apparatus controlling section 23 supplies information to the information outputting module 24 such that the information is displayed.

The information outputting module 24 includes, for example, a display, a speaker and so forth and outputs information supplied thereto from the apparatus controlling section 23 to the user. For example, the information outputting module 24 causes information supplied from the apparatus controlling section 23 to be displayed on a display provided in the information outputting module 24 itself or the like to present desired information to the user.

The wireless communication module 25 operates as a communication module for allowing the wireless communication apparatus 11 to actually carry out wireless communication operation. In particular, the wireless communication module 25 transmits data supplied from the apparatus controlling section 23 with frames of a predetermined format by wireless communication, and receives a signal transmitted thereto by wireless communication and supplies data extracted from the received signal to the apparatus controlling section 23.

<Configuration Example of Wireless Communication Module>

Figure 3:
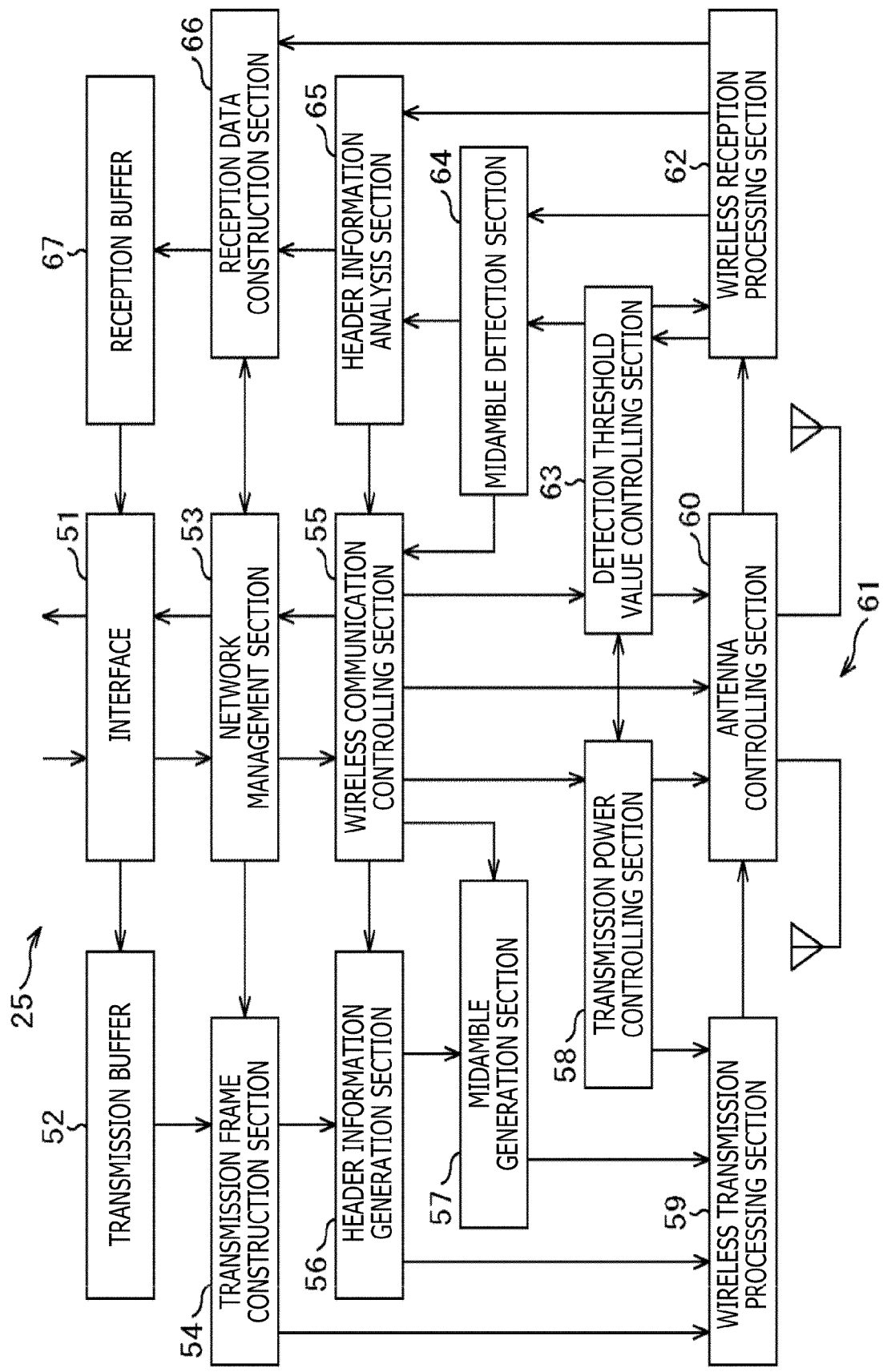
FIG. 3 is a view depicting a configuration example of a wireless communication module.

The wireless communication module 25 of the wireless communication apparatus 11 is configured, for example, in such a manner as depicted in FIG. 3.

The wireless communication module 25 depicted in FIG. 3 includes an interface 51, a transmission buffer 52, a network management section 53, a transmission frame construction section 54, a wireless communication controlling section 55, a header information generation section 56, a midamble generation section 57, a transmission power controlling section 58, a wireless transmission processing section 59, an antenna controlling section 60, an antenna 61, a wireless reception processing section 62, a detection threshold value controlling section 63, a midamble detection section 64, a header information analysis section 65, a reception data construction section 66, and a reception buffer 67.

The interface 51 is connected to a different module configuring the wireless communication apparatus 11 such as, for example, the apparatus controlling section 23 such that it supplies data supplied from the different module to the transmission buffer 52 and supplies data retained in the reception buffer 67 to the different module. Further, the interface 51 supplies information supplied from a different module such as the apparatus controlling section 23 and supplies information supplied from the network management section 53 to the different module such as the apparatus controlling section 23.

The transmission buffer 52 retains data supplied from the interface 51 and supplies the retained data to the transmission frame construction section 54.

For example, data retains in the transmission buffer 52 is data to be stored into a MAC layer protocol data unit (MPDU) for performing wireless transmission.

The network management section 53 manages a network that overlaps with the wireless communication apparatus itself with ambient wireless communication apparatus. In particular, the network management section 53 supplies information supplied from the interface 51 or the reception data construction section 66 to the wireless communication controlling section 55. Further, the network management section 53 instructs the transmission frame construction section 54 to construct a frame configured from a predetermined number of MPDUs and instructs the reception data construction section 66 to construct data in a predetermined unit.

The transmission frame construction section 54 places data retained in the transmission buffer 52 into an MPDU in accordance with an instruction from the network management section 53 and connects a plurality of MPDUs to construct a wireless communication frame in a predetermined aggregation unit for wireless communication.

The transmission frame construction section 54 supplies a constructed wireless communication frame as a transmission frame to the wireless transmission processing section 59 and supplies necessary information relating to the transmission frame to the header information generation section 56.

It is to be noted that, in the following description, a wireless communication frame transmitted by the wireless communication apparatus 11 is referred to specifically as transmission frame, and data placed in an MPDU of the transmission frame is hereinafter referred to also as transmission data. Further, a wireless communication frame received by the wireless communication apparatus 11 is referred to specifically as reception frame, and data placed in an MPDU of the reception frame is referred to also as reception data.

The wireless communication controlling section 55 carries out access communication control on a wireless transmission line in accordance with a predetermined communication protocol.

In particular, the wireless communication controlling section 55 controls the components of the wireless communication module 25 in accordance with information and so forth supplied from the network management section 53, the midamble detection section 64, the header information analysis section 65 and so forth to control transmission and reception by wireless communication.

For example, the wireless communication controlling section 55 supplies necessary information to the header information generation section 56, the midamble generation section 57, the transmission power controlling section 58, the antenna controlling section 60, and the detection threshold value controlling section 63 to control various operations relating to wireless communication and supplies information relating to the network obtained from received signals and so forth to the network management section 53.

The header information generation section 56 generates a preamble including header information on the basis of information supplied from the transmission frame construction section 54 and the wireless communication controlling section 55 and supplies the midamble generation section 57 and the wireless transmission processing section 59. In other words, the header information generation section 56 functions as a preamble generation section that generates a preamble including header information.

The preamble generated in such a manner is added to the top portion of a transmission frame. It is to be noted that, from the header information generation section 56 to the midamble generation section 57, only necessary information from within the information included in the preamble is supplied.

The midamble generation section 57 generates a midamble on the basis of information supplied from the header information generation section 56 and the wireless communication controlling section 55 and supplies the midamble to the wireless transmission processing section 59.

The midamble includes information of at least part of header information generated by the header information generation section 56 and information of at least part of information included in the preamble generated by the header information generation section 56 but other than the header information. Further, the midamble is inserted into (deployed at) the middle of a transmission frame.

The transmission power controlling section 58 controls the wireless transmission processing section 59 and the antenna controlling section 60 in accordance with an instruction from the wireless communication controlling section 55 to adjust (control) the transmission power of a transmission frame to be transmitted to a different apparatus that communicates by wireless communication with the wireless communication apparatus 11 as occasion demands. In short, the transmission power controlling section 58 controls operation of the wireless transmission processing section 59 and the antenna controlling section 60 such that a transmission frame is transmitted with predetermined transmission power.

The wireless transmission processing section 59 adds a preamble supplied from the header information generation section 56 and a midamble supplied from the midamble generation section 57 to appropriate positions of a transmission frame supplied from the transmission frame construction section 54 to generate a final transmission frame.

Further, the wireless transmission processing section 59 converts the obtained transmission frame into a predetermined baseband signal and performs modulation processing and signal processing on the basis of the baseband signal, and supplies a resulting transmission signal to the antenna controlling section 60. In particular, the wireless transmission processing section 59 transmits a transmission signal (transmission frame) to the antenna controlling section 60 and the antenna 61.

The antenna controlling section 60 controls the antenna 61 to output (transmit) a transmission signal supplied from the wireless transmission processing section 59 under the control of the transmission power controlling section 58. Further, the antenna controlling section 60 supplies a reception signal received by the antenna 61 to the wireless reception processing section 62.

The antenna 61 is configured from a plurality of elements, and transmits a transmission signal supplied from the antenna controlling section 60 by wireless transmission and supplies a reception signal transmitted thereto to the antenna controlling section 60.

The wireless reception processing section 62 compares a detection threshold value supplied from the detection threshold value controlling section 63 and reception power of a reception signal supplied from the antenna controlling section 60 to receive the reception signal transmitted by wireless transmission in a predetermined format as a reception frame through the antenna 61 and the antenna controlling section 60.

The detection threshold value controlling section 63 determines a detection threshold value to be used by the wireless reception processing section 62 while transferring necessary information to and from the wireless communication controlling section 55 and the transmission power controlling section 58 and supplies the determined detection threshold value to the wireless reception processing section 62. This detection threshold value is used to detect a preamble and a midamble included in a received signal.

The midamble detection section 64 detects a midamble added to the middle of a frame (reception frame) of a reception signal received by the wireless reception processing section 62 and supplies information extracted from the midamble to the wireless communication controlling section 55 and the header information analysis section 65.

The header information analysis section 65 detects a preamble added to the top of a frame (reception frame) of a reception signal received by the wireless reception processing section 62, and extracts header information from the preamble and analyzes the description of the header information. Further, as occasion demands, the header information analysis section 65 analyzes the description of part of the header information extracted from a midamble by the midamble detection section 64. Further, the header information analysis section 65 supplies the information included in the extracted header information to the wireless communication controlling section 55 and the reception data construction section 66.

In short, the header information analysis section 65 functions as a preamble detection section that detects a preamble from a reception frame and extracts header information and so forth from the detected preamble.

The reception data construction section 66 constructs, on the basis of information supplied from the header information analysis section 65, a reception signal received by the wireless reception processing section 62, namely, an aggregated reception frame, in a predetermined unit as reception data. The reception data construction section 66 supplies the constructed reception data to the network management section 53 and the reception buffer 67.

The reception buffer 67 retains reception data supplied form the reception data construction section 66 and supplies the retained reception data to the interface 51. The data retained in the reception buffer 67 is reception data extracted from a MAC layer protocol data unit (MPDU) of a reception frame.

<Examples of Frame Format>

Here, the format of a signal transferred between wireless communication apparatus is described.

Figure 4:
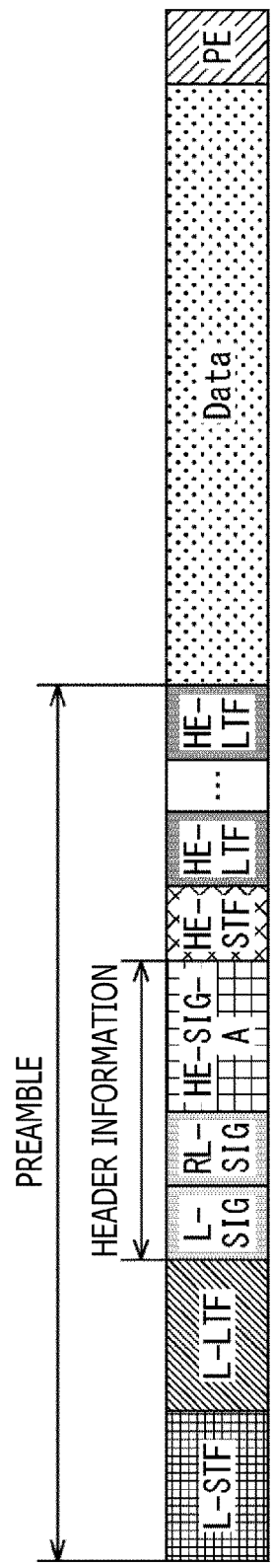
FIG. 4 is a view depicting a general frame format.

For example, in the case where frame aggregation is not performed, generally a transmission frame of a frame format depicted in FIG. 4 is transferred between wireless communication apparatus.

In the example depicted in FIG. 4, a preamble is deployed at the top of data for one frame of a transmission frame and is followed by transmission data.

In particular, in the preamble, L-STF, L-LTF, L-SIG, RL-SIT, HE-SIG-A, HE-STF, and a predetermined number of HE-LTF are deployed in order.

Here, L-STF is conventionally called short training field (Legacy Short Training Field), and is utilized a reference for start detection of a transmission frame and time synchronization processing and is utilized also for estimation of a frequency error and automatic gain control (Automatic Gain Control). Since this L-STF is configured such that a predetermined sequence is repeated, a wireless communication apparatus on the reception side can detect a start position of a transmission frame by detecting a correlation of the sequence.

L-LTF is conventionally called long training field (Legacy Long Training Field) and is configured such that a predetermined sequence is repeated. L-LTF is utilized to carry out channel estimation and estimation of the S/N (Signal/Noise) ratio as well as synchronization between time and a frequency.

L-SIG is conventionally called signal (Legacy Signal) field and is signaling information configured such that rate information and length information of the data part are described in the OFDM symbol at the top.

RL-SIG is information (signaling information) set in order to detect that the transmission frame is not a frame of a method of a preceding generation but is HE-PPDU.

This RL-SIG is information quite same as L-SIG, and a transmission frame is configured such that L-SIG and RL-SIG are deployed successively and, as a result, L-SIG is equivalently deployed repeatedly.

A wireless communication apparatus on the reception side can specify, by detecting L-SIG and RL-SIG deployed successively, that the transmission frame is of a format of a predetermined generation, namely, is a transmission frame of the frame format depicted in FIG. 4.

HE-SIG-A is, as the A field of the signal in a high density system, information (signaling information) in which information for allowing application of a spatial multiplexing technology is deployed.

The wireless communication apparatus is configured such that predetermined communication is carried out in accordance with parameters included in this HE-SIG-A, and although parameters relating to BSS Color information and Spatial Reuse are described in HE-SIG-A, further various parameters are included in HE-SIG-A as occasion demands.

The part including L-SIG, RL-SIG, and HE-SIG-A in the preamble configures header information.

Meanwhile, HE-STF is a short training field (High Efficiency Short Training Field) in the high density system and is utilized for synchronization processing and adjustment of physical layer parameters, which are required to achieve high density.

HE-LTF is a long training field (High Efficiency Long Training Field) in the high density system.

This HE-LTF is configured such that, in the case where transmission by a spatial multiplexed stream by MIMO (Multiple Input Multiple Output) is to be carried out, a number of trainings corresponding to the spatial multiplexed stream number is deployed. In short, a predetermined number of HE-LTF are deployed after HE-STF.

The part from L-STF to HE-LTF described above configures a preamble deployed at the top of a transmission frame. A wireless communication apparatus on the reception side can grasp that a transmission frame is transmitted thereto by detecting such a preamble part as just described.

Further, Data following the preamble indicates transmission data, and PE (Packet Extension) is deployed at the tail end of the transmission frame following the transmission data as occasion demands.

It is to be noted that the long training field (LTF) such as L-LTF and HE-LTF may be configured from a training sequence part and a guard interval part. Further, the long training field may be configured such that one guard interval is included in two OFDM symbols or may be configured such that two guard intervals are included in two OFDM symbols.

Furthermore, L-SIG depicted in FIG. 4 is configured, for example, in such a manner as depicted in FIG. 5.

In the example depicted in FIG. 5, L-SIG includes rate information indicated by character "RATE," length information indicated by character "LENGTH," a parity bit indicated by character "P," tail bit information indicated by character "Tail" and so forth.

The rate information is information indicative of a rate (bit rate) of transmission data indicated by character "Data" depicted in FIG. 4, and the length information is information indicative of a length of transmission data indicated by character "Data" depicted in FIG. 4.

Meanwhile, HE-SIG-A depicted in FIG. 4 is configured, for example, in such a manner as depicted in FIG. 6.

In the example depicted in FIG. 6, HE-SIG-A includes, as representative parameters relating to the present technology, uplink/downlink identifier information indicated by character "UL/DL," MCS parameter information indicated by character "MCS," BSS color information indicated by character "BSS Color," parameter information relating to the advanced space reuse technology indicated by character "Spatial Reuse," bandwidth information indicated by character "Bandwidth," parameter information of a size of a guard interval and a training field indicated by character "GI+TF Size," spatial multiplexed stream number information indicated by character "Nsts," duration information of a transmission opportunity indicated by character "TXOP Duration," an error detection code (CRC (Cyclic Redundancy Check)) indicated by character "CRC," tail bit information indicated by character "Tail" and so forth.

For example, the MCS parameter is information indicative of a modulation method and an encoding scheme of transmission data (transmission frame), and the BSS color information is information indicative of the BSS to which an apparatus of a transmission source of transmission data belongs.

<Configuration Example of Frame Upon Frame Aggregation>

Figure 7:
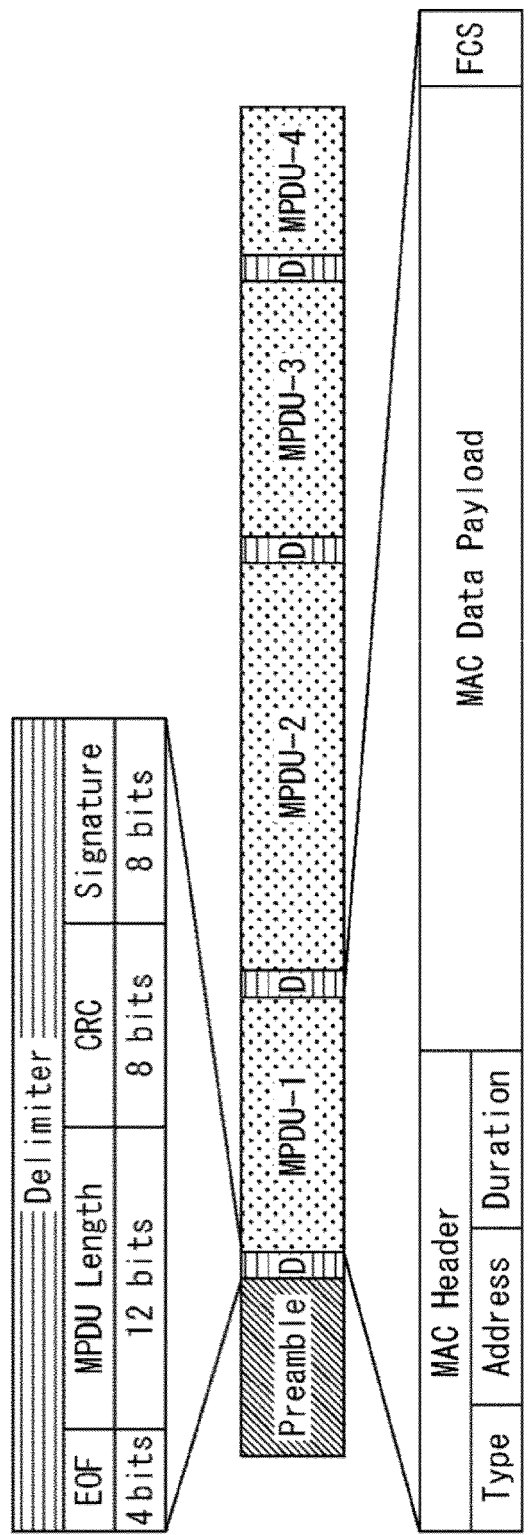
FIG. 7 is a view depicting a configuration example of a transmission frame for which frame aggregation has been performed.

Furthermore, in the case where frame aggregation is performed, a general frame configuration of a transmission frame is such as depicted in FIG. 7.

FIG. 7 depicts an example in which four MAC layer protocol data units (MPDUs) are aggregated (connected) into a single transmission frame.

Here, following the preamble (Preamble) at the top of the transmission frame aggregated, four MPDUs denoted by "MPDU-1" to "MPDU-4" are deployed, and delimiter information indicated by character "D" is deployed immediately preceding to each MPDU.

The preamble includes a predetermined legacy training field, PHY header information, and a training field for a predetermined space multiplexed stream, and the four MPDUs are combined with this preamble to configure one transmission frame.

Further, the delimiter information deployed immediately preceding to each MPDU includes MPDU length information indicated by character "MPDU Length" and CRC, and the MPDU length information indicates an information length, namely, a length, of the MPDU deployed immediately following the delimiter information.

Furthermore, in each MPDU, MAC header information indicated by character "MAC Header" is deployed at the top portion of the MPDUs. In this MAC header information, address information indicted by character "Address" and Duration information indicated by character "Duration" are deployed.

Here, the address information is information indicative of an address for identifying a destination of the MPDU, namely, an apparatus of a transmission destination of the transmission frame or an address for identifying an apparatus of a reception destination, and the Duration information is information indicative of a duration of the MPDU. In short, communication (transmission and reception) of the MPDU is performed only for the duration indicated by the Duration information.

In the MPDU, next to the MAC header information, a payload indicated by character "MAC Data Payload," namely, transmission data deployed in the MPDU, is deployed. This payload has a variable length.

In the MPDU, next to the MAC header information, namely, at the last end (tail end) of the MPDU, a frame check sequence (FCS (Frame Check Sequence)) indicated by character "FCS" is deployed. This frame check sequence makes it possible for the reception side of the transmission frame to perform error detection.

A plurality of MPDUs in which variable length data is deployed is aggregated to form a transmission frame (burst) in such a manner as described above, and the resulting transmission frame can be transmitted.

Figure 8:
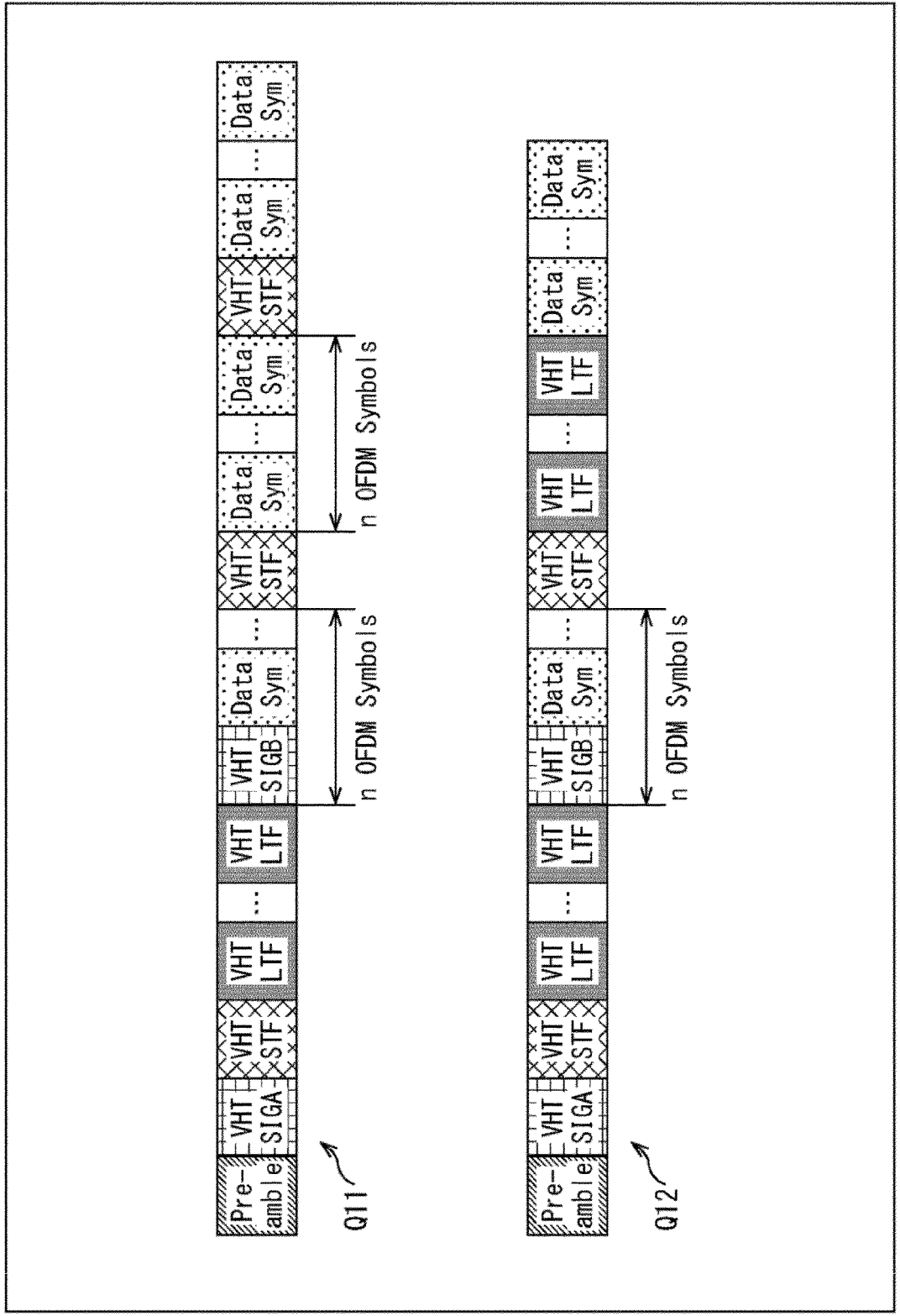
FIG. 8 is a view depicting configuration examples of a transmission frame in which a midamble is inserted.

Incidentally, technologies for inserting a midamble for resynchronization to the middle of a transmission frame have been proposed already, and among them, technologies that adopt such midamble deployments as depicted in FIGS. 8 and 9 have been proposed.

For example, the examples indicated by an arrow mark Q11 and another arrow mark Q12 in FIG. 8 are configured such that a training field is inserted in a long data unit.

In particular, transmission data are placed in a portion of OFDM symbols (plural) indicated by character "Data Sym," and training fields such as VHT LTF (Very High Throughput Long Training Field), VHT STF (Very High Throughput Short Training Field) and so forth are deployed before the transmission data.

Especially, it can be recognized that those examples are configured in most cases such that a training field is added for each n OFDM symbols. In other words, the examples are configured such that a training field is inserted into and wirelessly transmitted together with known n OFDM symbols determined in advance from a wireless communication apparatus on the transmission side.

In the example indicated by the arrow mark Q11, VHT STF is inserted as a midamble for each n OFDM symbols, and in the example indicated by the arrow mark Q12, VHT STF and a plurality of VHT LTF are inserted as a midamble.

The number of OFDM symbols in which such training fields as VHT STF and VHT LTF are inserted is grasped also by the reception side. According, the wireless communication apparatus on the reception side can extract, after it extracts the predetermined number of OFDM symbols after an end of the training field in the header, the training field as the midamble inserted in the middle.

Meanwhile, in the example indicated by the arrow mark Q21 in FIG. 9, a plurality of VHT LTF is inserted for each n OFDM symbols, and where m is an integer multiple of the number n of OFDM symbols in which VHT LTF is inserted, VHT STF is inserted for each multiple m. Also in this example, training fields such as VHT LTF and VHT STF are inserted as a midamble.

Also it has been proposed to deploy N-SIG after a training field such as VHT LTF or VHT STF as indicated by an arrow mark Q22. In this example, N-SIG is information indicative of whether a next training field exists at a position n OFDM symbols ahead.

<Configuration Example of Frame to Which Present Technology is Applied>

In such examples depicted in FIGS. 8 and 9 as described above, a frame configuration that a midamble configured from a training field is inserted in the middle of a transmission frame is adopted.

However, a training field deployed in the middle of a transmission frame is deployed for the object of correcting symbol synchronization or frequency error. Therefore, when a transmission frame is received beginning with the middle thereof, parameters described in header information deployed at the top portion of the transmission frame cannot be obtained.

Therefore, in the present technology, in a midamble inserted in the middle of a transmission frame, not only a training field but also at least part of information (parameters) included in header information in the preamble of the transmission frame are placed.

Figure 10:
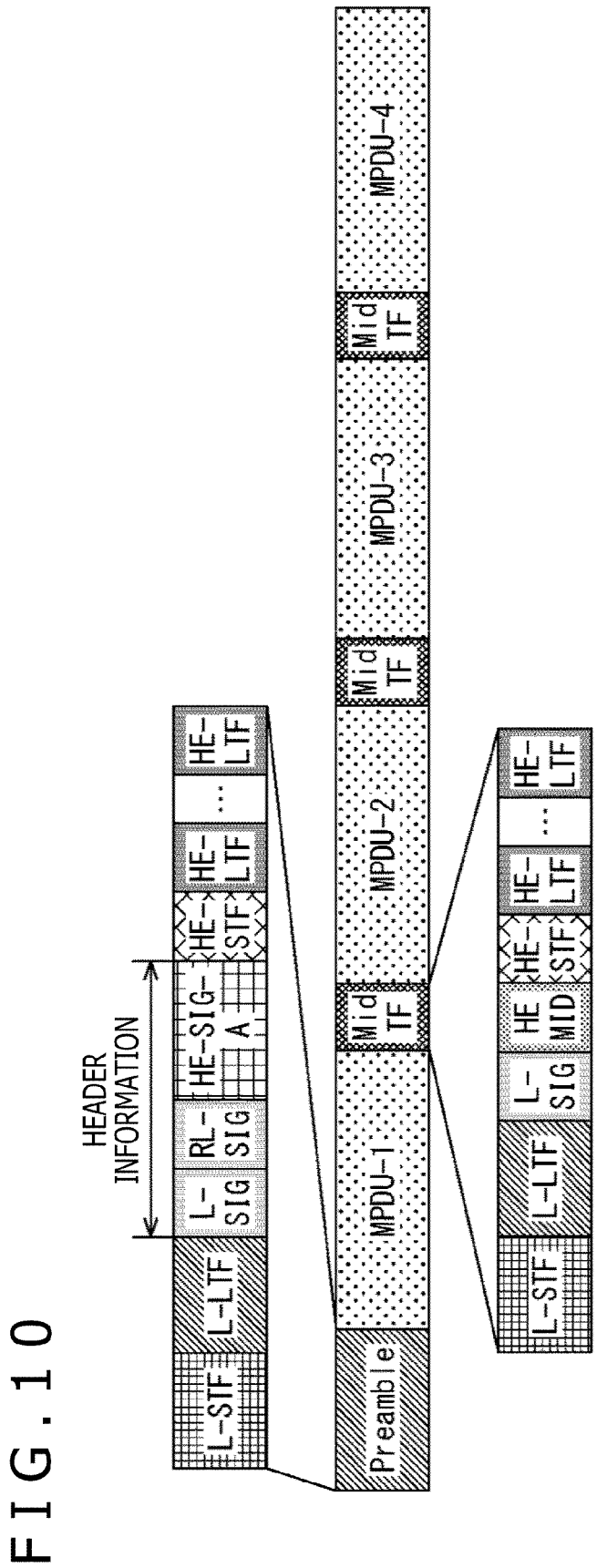
FIG. 10 is a view depicting a configuration example of a transmission frame to which the present technology is applied.

Such a transmission frame to which the present invention is applied as described above has, for example, such a configuration as depicted in FIG. 10.

In the example depicted in FIG. 10, a preamble indicated by character "Preamble" is deployed at the top of the transmission frame and is followed by an aggregated MPDU indicated by characters "MPDU-1" to "MPDU-4." Further, between each adjacent ones of the MPDUs in the middle of the transmission frame, a midamble including a training field indicated by character "Mid TF" is inserted (deployed).

In other words, the transmission frame is configured such that a preamble is added to the top of a portion configured from a plurality of MPDUs and a midamble is inserted between adjacent ones of the MPDUs. In short, a midamble is deployed for each MPDU.

It is to be noted that, although the insertion position of a midamble can be an arbitrary position such as a position after each number of OFDM symbols determined in advance, in the case where a plurality of MPDUs is aggregated to configure a transmission frame, a midamble may be inserted at an end of an OFDM symbol for each end of an MPDU, namely, in a unit of an MPDU. Especially in this example, the transmission frame is configured such that a midamble is inserted in a unit of an MPDU unit.

In a general transmission frame, since a midamble has been deployed for each predetermined number of OFDM symbols, reception processing has not been able to converge for each MPDU. Therefore, separately from information indicative of the information length of an MPDU, information for transmitting the number of OFDM symbols into which a midamble is to be inserted has been necessitated.

Further, in a general transmission frame, the number of OFDM symbols into which a midamble is inserted and the information length of an MPDU have no clear correlation therebetween. Therefore, in the case where a plurality of MPDUs is aggregated into one transmission frame, a process for grasping a midamble insertion position and stopping decoding of a received transmission frame is necessitated.

In contrast, by deploying a midamble in a unit of an MPDU as in the example depicted in FIG. 10, the necessity for information for transmitting the number of OFDM symbols is eliminated, and the communication efficiency can be improved. Further, since a midamble is not deployed in the middle of an MPDU, processing such as decoding can be performed simply in a unit of an MPDU.

In the preamble deployed at the top of a transmission frame, L-STF, L-LTF, L-SIG, RL-SIG, HE-SIG-A, HE-STF, and a predetermined number of HE-LTF are deployed in order from the top, and the deployment of the information is same as that in the case of the preamble of the transmission frame depicted in FIG. 4. Further, in the preamble part, L-STF, L-LTF, HE-STF, and HE-LTF are information for training, and the portion of L-SIG, RL-SIG, and HE-SIG-A is header information.

In order to keep compatibility with existing products, namely, in order to keep compatibility with the standards in preceding generations, the preamble has deployed therein L-STF that is legacy STF, L-LTF that is legacy LTF, L-SIG that is legacy SIGNAL, and RL-SIG that is repetitions of L-SIG.

Further, in the preamble, at positions after L-STF, L-LTF, L-SIG, and RL-SIG, HE-STF that is STF (short training field) of the high density system and HE-LTF that is LTF (long training field) of the high density system are deployed. Especially here, a predetermined number of HE-LTF are deployed successively.

In the example of FIG. 10, following the preamble, one MPDU indicated by character "MPDU-1" is deployed, and transmission data is placed in the MPDU. Here, each MPDU that is a data part has a length of delimited OFDM symbols determined in advance. This MPDU has a configuration same as that of the MPDU depicted in FIG. 7, and MAC header information in which address information and Duration information are placed is deployed at the top of the MPDU and transmission data, namely, a payload, is deployed next to the MAC header information.

Further, next to the MPDU, a midamble indicated by character "Mid TF" is deployed, and in this midamble, at least part of the information included in the preamble deployed at the top of the transmission frame is placed.

In other words, the midamble includes information of at least part of the header information in the preamble and information of at least part of the information other than the header information in the preamble. Here, the information other than the header information included in the preamble is information for a training field such as L-STF, L-LTF, HE-STF, and HE-LTF, namely, for training.

In the example depicted in FIG. 10, in the midamble, L-STF, L-LTF, L-SIG, HE MID, HE-STF, and a predetermined number of HE-LTF are deployed in order from the top.

Especially here, a number of HE-LTF equal to that in the case of the preamble are deployed in a successively lined up relationship in the midamble, and the positional relationship in deployment of L-STF, L-LTF, L-SIG, HE-STF, and HE-LTF is a same positional relationship as that in the case of the preamble.

In other words, L-STF, L-LTF, L-SIG, HE-STF, and HE-LTF that are information included in common in the preamble and the midamble are deployed in a same order and in a same number in the preamble and the midamble.

It is to be noted that an example in which information included in common in the preamble and the midamble is common in deployment in the preamble and the midamble is described here. However, the information included in common in the preamble and the midamble may otherwise be different in deployment in the preamble and the midamble.

In the midamble, L-STF, L-LTF, HE-STF, and HE-LTF are placed as information for training, and L-SIG and HE MID are placed as part of the information included in the header information.

Here, L-SIG is information, for example, of the configuration depicted in FIG. 5, and in L-SIG, the rate information and the length information described hereinabove are placed. Further, HE MID is midamble information of the high density system, and in this HE MID, part of information included in HE-SIG-A in the header information and so forth are placed. It is to be noted that details of HE MID are hereinafter described.

Further, in the example of FIG. 10, following the midamble deployed immediately after an MPDU indicated by character "MPDU-1," an MPDU indicated by character "MPDU-2," a midamble, an MPDU indicated by character "MPDU-3," a midamble, and an MPDU indicated by character "MPDU-4" are deployed in order.

Accordingly, in the case where the transmission frame depicted in FIG. 10 is to be transmitted, the preamble is transmitted first, and then after one MPDU is transmitted, a midamble is transmitted. Thereafter, an MPDU and a midamble are transmitted alternately in order until the tail end of the aggregated frame is reached.

It is to be noted that, although an example in which a midamble (Mid TF) is inserted for each predetermined length is described here, a midamble may be inserted for each variable length MPDU.

Figure 11:
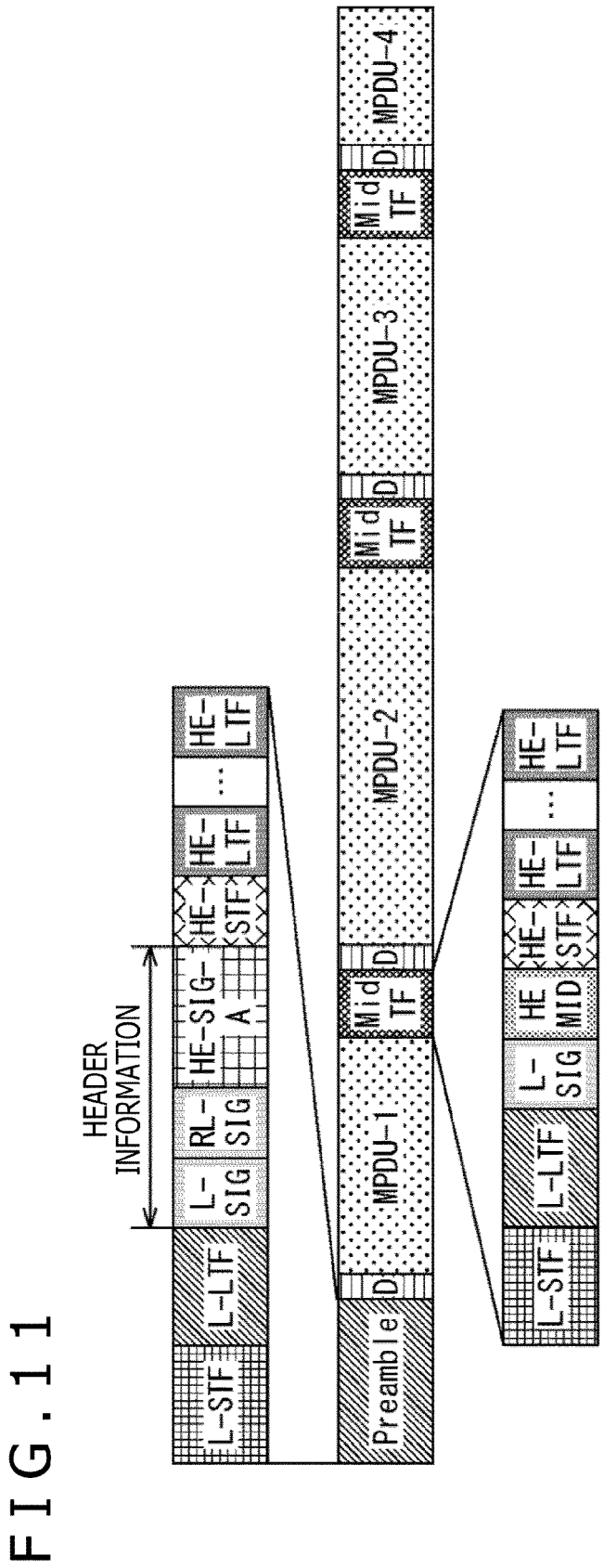
FIG. 11 is a view depicting another configuration example of a transmission frame to which the present technology is applied.

In such a case as just described, it is sufficient if delimiter information is deployed immediately before each MPDU, for example, as depicted in FIG. 11 such that the length of each MPDU can be specified.

In the example depicted in FIG. 11, a preamble indicated by character "Preamble" is deployed at the top of the transmission frame, and an aggregated MPDU indicated by characters "MPDU-1" to "MPDU-4" is deployed next to the preamble. Here, the information length of each MPDU is a variable length. Further, between each adjacent ones of the MPDUs, a midamble indicated by character "Mid TF" is inserted, and delimiter information indicated by character "D" is inserted immediately before each MPDU.

In the transmission frame depicted in FIG. 11, although the deployment of the preamble, MPDUs, and midambles is same as that in the example of the transmission frame depicted in FIG. 10, in the transmission frame depicted in FIG. 11, delimiter information is further deployed immediately before each MPDU.

For example, the delimiter information deployed immediately before the MPDU indicated by character "MPDU-1" includes MPDU length information indicative of an information length of the MPDU deployed immediately after the delimiter information, namely, a length of the MPDU. In particular, for example, the delimiter information is information having the configuration depicted in FIG. 7, and includes MPDU length information and CRC.

Accordingly, on the reception side of the transmission frame, since the length of an MPDU immediately after delimiter information can be specified by the delimiter information, the position of the midamble placed after the MPDU, namely, the insertion position of the midamble, can be specified.

It is to be noted that, in the example depicted in FIG. 11, information included in the preamble and deployment positions of the information as well as information included in the midambles and deployment positions of the information are same as those in the case of the example of a transmission frame depicted in FIG. 10.

<Configuration Example of Midamble>

Further, information (fields) placed in a midamble and deployment of the information are not limited to those of the examples depicted in FIGS. 10 and 11 and may be any information and deployment.

In particular, various variations are supposed in regard to the configuration of a midamble, and any configuration may be applied if it includes HE MID without fail among L-STF, L-LTF, L-SIG, HE MID, HE-STF, and HE-LTF.

Figure 12:
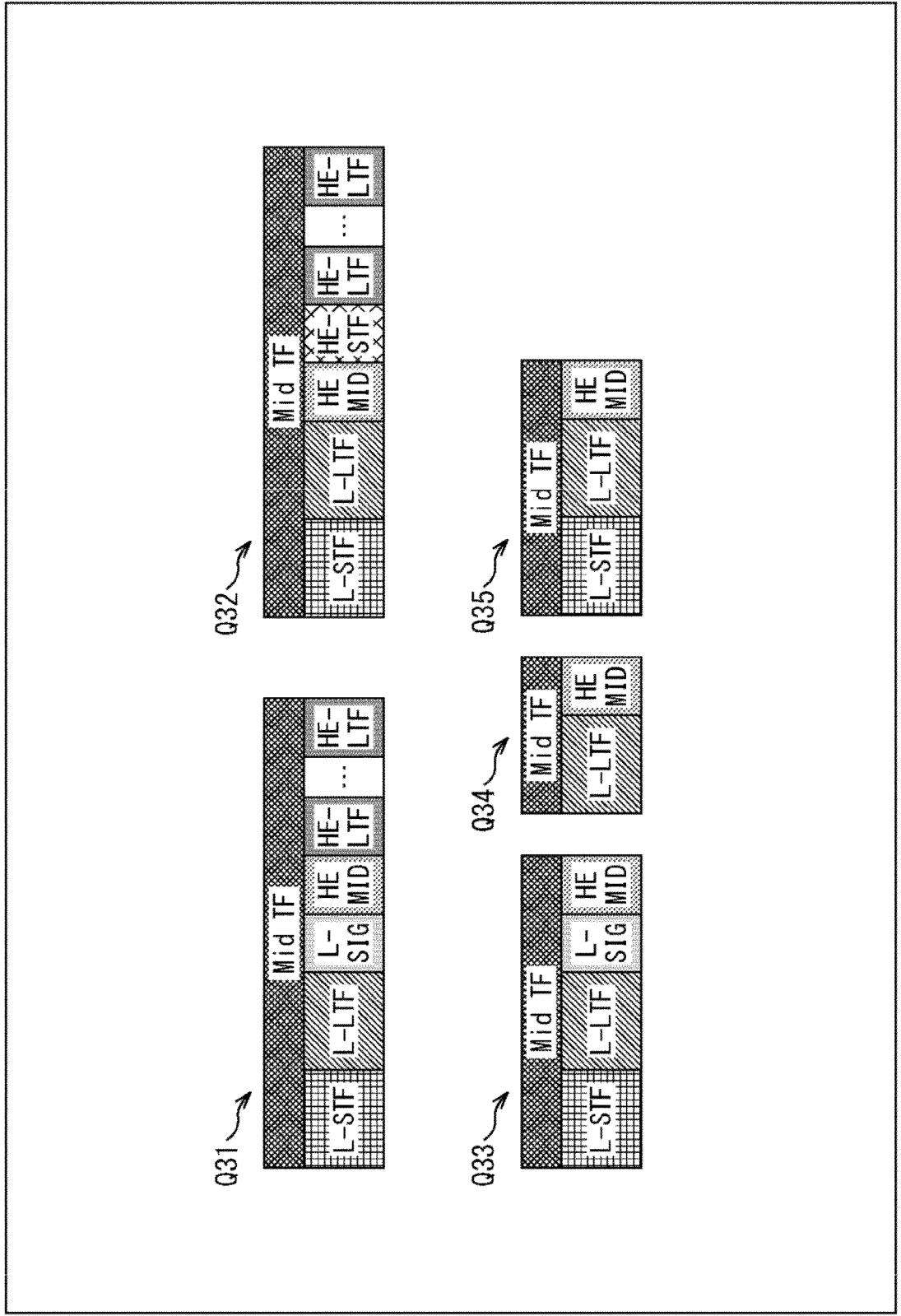
FIG. 12 is a view depicting configuration examples of a midamble.
Figure 13:
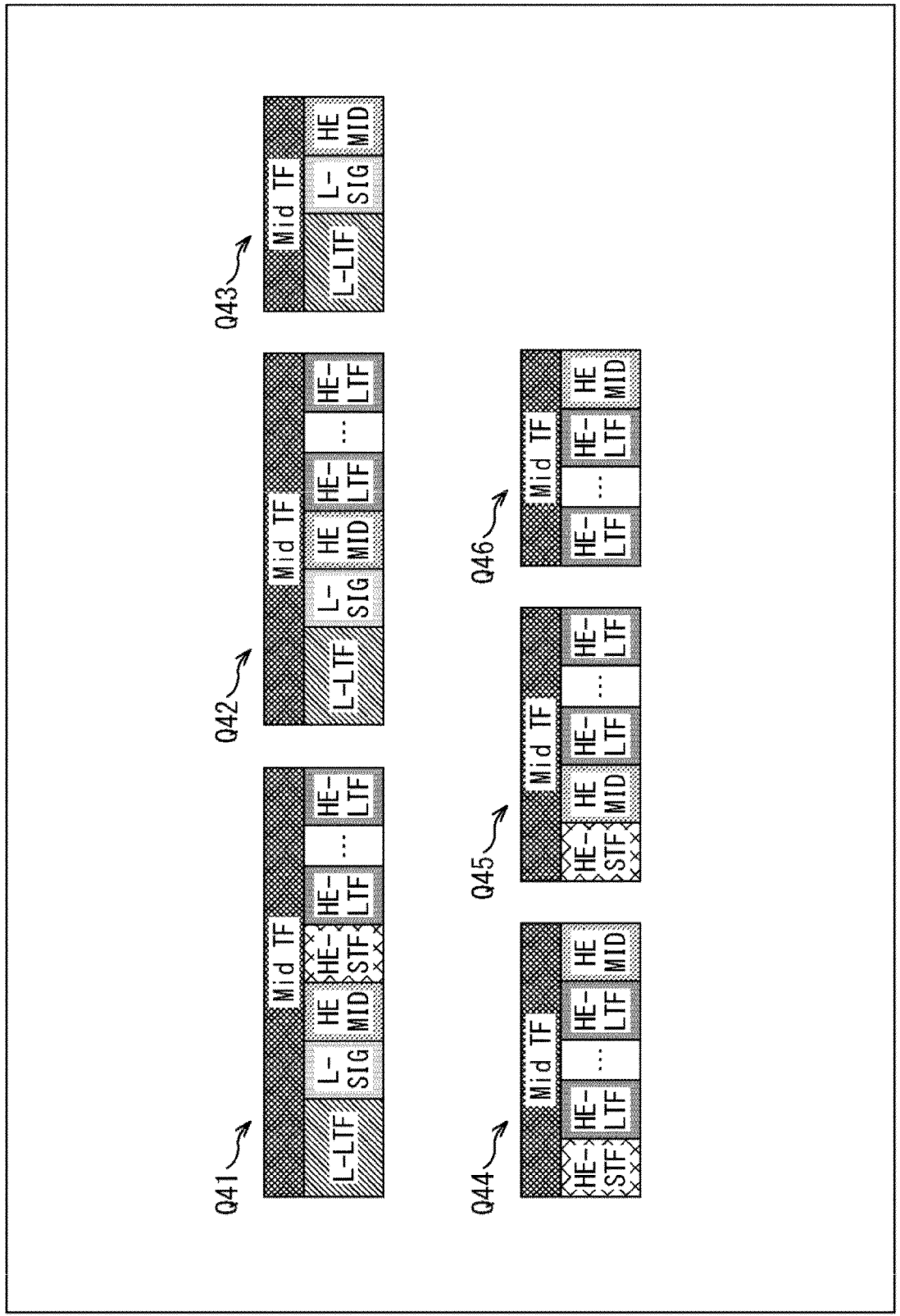
FIG. 13 is a view depicting configuration examples of a midamble.
Figure 14:
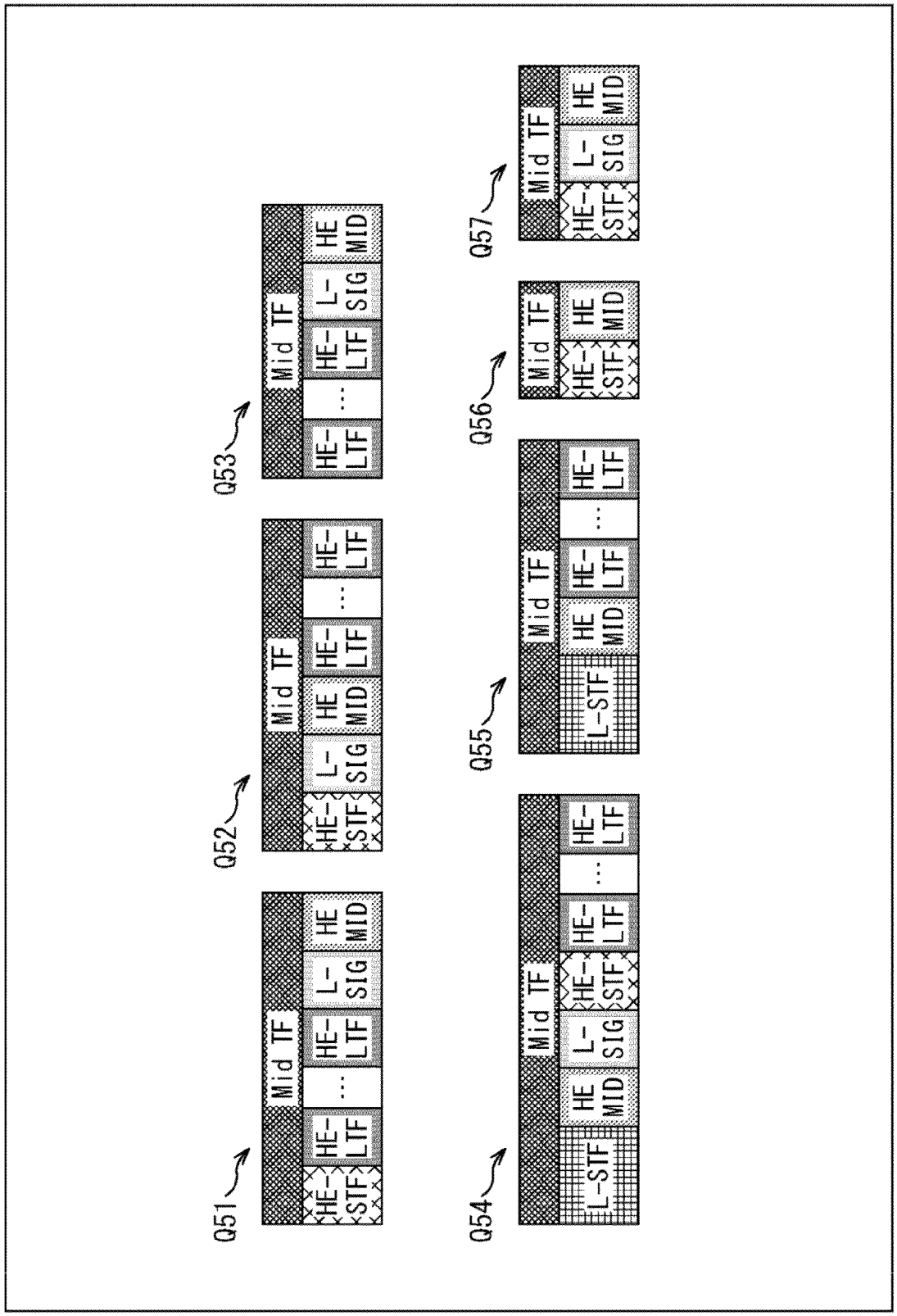
FIG. 14 is a view depicting configuration examples of a midamble.

In particular, for example, a midamble can be configured in such a manner as to FIGS. 12 to 14.

In the example indicated by an arrow mark Q31 in FIG. 12, in the midamble, L-STF, L-LTF, L-SIG, HE MID, and a predetermined number of HE-STF are deployed in order from the top. This example is an example that does not include HE-STF in the example depicted in FIG. 10 or 11.

Meanwhile, in the example indicated by an arrow mark Q32, L-STF, L-LTF, HE MID, and a predetermined number of HE-STF are deployed in order from the top. This example is an example that does not include L-SIG in the example depicted in FIG. 10 or 11.

In the example indicated by an arrow mark Q33, in the midamble, L-STF, L-LTF, L-SIG, and HE-MID are deployed in order from the top.

Further, in the example indicated by an arrow mark Q34, in the midamble, L-LTF and HE MID are deployed in order from the top. In the example indicated by an arrow mark Q35, L-STF, L-LTF, and HE MID are deployed in order from the top.

Although, in the examples indicated by the arrow marks Q31 to Q33 and Q35, L-STF for detecting synchronism is deployed preferentially at the top portion of the midamble, in the example indicated by the arrow mark Q34, not L-STF but L-LTF is deployed at the top portion of the midamble.

Further, in the example indicated by an arrow mark Q41 in FIG. 13, in the midamble, L-LTF, L-SIG, HE MID, HE-STF, and a predetermined number of HE-LTF are deployed in order from the top.

In the example indicated by an arrow mark Q42, in the midamble, L-LTF, L-SIG, HE MID, and a predetermined number of HE-LTF are deployed in order from the top.

In the example indicated by an arrow mark Q43, in the midamble, L-LTF, L-SIG, and HE MID are deployed in order from the top.

In the example indicated by an arrow mark Q44, in the midamble, HE-STF, a predetermined number of HE-LTF, and HE MID are deployed in order from the top.

In the example indicated by an arrow mark Q45, in the midamble, HE-STF, HE MID, and a predetermined number of HE-LTF are deployed in order from the top.

In the example indicated by an arrow mark Q46, in the midamble, a predetermined number of HE-LTF and HE MID are deployed in order from the top.

For example, if, by receiving only HE-LTF, it is possible to perform such processes as synchronization and a frequency error of a transmission frame, channel estimation and so forth can be performed, then the midamble need not necessarily include legacy L-SFT or L-LTF. In other words, the midamble may be configured such that L-SFT and L-LTF are omitted, for example, as in the examples indicated by the arrow marks Q44 to Q46.

Also legacy L-SIG need not necessarily be included in the midamble if the information length of an MPDU unit can be grasped from MPDU length information of delimiter information added to the MPDU. For example, in the case of the frame configuration in which delimiter information is added to each MPDU as in the example depicted in FIG. 11, the midamble may not include L-SIG as in the examples indicated by the arrow marks Q44 to Q46.

Further, for example, in the example indicated by an arrow mark Q51 in FIG. 14, in the midamble, HE-STF, a predetermined number of HE-LTF, L-SIG, and HE MID are deployed in order from the top.

In the example indicated by an arrow mark Q52, in the midamble, HE-STF, L-SIG, HE MID, and a predetermined number of HE-LTF are deployed in order from the top.

In the example indicated by an arrow mark Q53, in the midamble, a predetermined number of HE-LTF, L-SIG, and HE MID are deployed in order from the top.

In the example indicated by an arrow mark Q54, in the midamble, L-STF, HE MID, L-SIG, HE-STF, and a predetermined number of HE-LTF are deployed in order from the top.

In the example indicated by an arrow mark Q55, in the midamble, L-STF, HE MID, and a predetermined number of HE-LTF are deployed in order from the top.

In the example indicated by an arrow mark Q56, in the midamble, HE-STF and HE MID are deployed in order from the top. In the example indicated by an arrow mark Q57, in the midamble, HE-STF, L-SIG, and HE MID are deployed in order from the top.

As indicated in FIGS. 12 to 14 described above, various variations are available as the midamble, and any information (field) may be placed in the midamble. In short, a predetermined field may not be included in the midamble as occasion demands. Further, the fields included in the midamble may be arrayed in any array.

<Configuration Example of HE MID>

Now, configuration examples of HE MID to be placed in the midamble to which the present technology is applied are described.

HE MID is midamble information of the high density system and forms part of training (Mid TF) of the midamble.

HE MID is configured, for example, in such a manner as depicted in FIG. 15.

In the example depicted in FIG. 15, HE MID includes rate information indicated by character "Rate," Duration information indicated by character "Remaining Duration (Length)," a parity indicated by character "P," transmission power control level information indicated by character "TPC level," and number information of HE-LTF indicated by character "Number of HE-LTF."

It is to be noted that a region indicated by character "R" in HE MID depicted in FIG. 15 is a Reserved region.

HE MID further includes information (hereinafter referred to as MCS parameters) relating to a modulation method and an encoding scheme indicated by character "MCS Parameter," parameters to be applied to the advanced space reuse technology indicated by character "Spatial Reuse," BSS Color information indicated by character "BSS Color," an error detection code (CRC) indicated by character "CRC," Tail bit indicated by character "Tail" and so forth.

For example, the rate information is information indicative of a rate (bit rate) of a transmission frame, namely, of transmission data, and this rate information is information included in L-SIG in header information.

Meanwhile, the Duration information is information indicative of a duration from a midamble in which this Duration information is included to the last (tail end) of the transmission frame, namely, a remaining time period until transmission (reception) of the transmission comes to an end.

The transmission power control level information is information indicative of the level of transmission power when the transmission frame is transmitted, and the number information of HE-LTF is information indicative of the number of HE-LTF included in the midamble.

The MCS parameters are information indicative of a modulation method and an encoding scheme of the transmission frame, and the parameters to be applied to the advanced space reuse technology are parameters (information) for advanced space reuse, which are necessitated, for example, to perform transmission of transmission data by the advanced space reuse technology.

The BSS Color information is identification information for identifying a BSS to which the wireless communication apparatus from which the transmission frame has been transmitted belongs, and the CRC is an error detection code of the midamble part and the Tail bit is a bit string indicative of the end position of HE MID.

The MCS parameters, parameters to be applied to the advanced space reuse technology, BSS Color information, and CRC are information included in HE-SIG-A as header information.

Further, in the example depicted in FIG. 15, the front portion of HE MID, namely, the portion from the rate information to the parity has an array same as the bit array of legacy L-SIG depicted in FIG. 5. In particular, in the front portion of HE MID, the rate information, Reserved region, Duration information, and parity are deployed in order from the top similarly as in L-SIG depicted in FIG. 5.

It is to be noted that the configuration of HE MID is not limited to the configuration depicted in FIG. 15 and may be any other configuration. For example, in HE MID, information (parameters) other than those depicted in FIG. 15 may be placed as occasion demands, or part of the information (parameters) depicted in FIG. 15 may not be included in HE MID. Further, also the order in array of the information to be placed in HE MID can be an arbitrary order.

<Improvement of Communication Efficiency by Present Technology>

Incidentally, in a general transmission frame, header information is not included except the top portion. Therefore, in the case where a wireless communication apparatus starts reception from the middle of a transmission frame, namely, in the case where a signal is successfully detected in the middle of a transmission frame during carrier detection, it cannot be specified whether the transmission frame is a signal in the BSS of the wireless communication apparatus itself.

Figure 16:
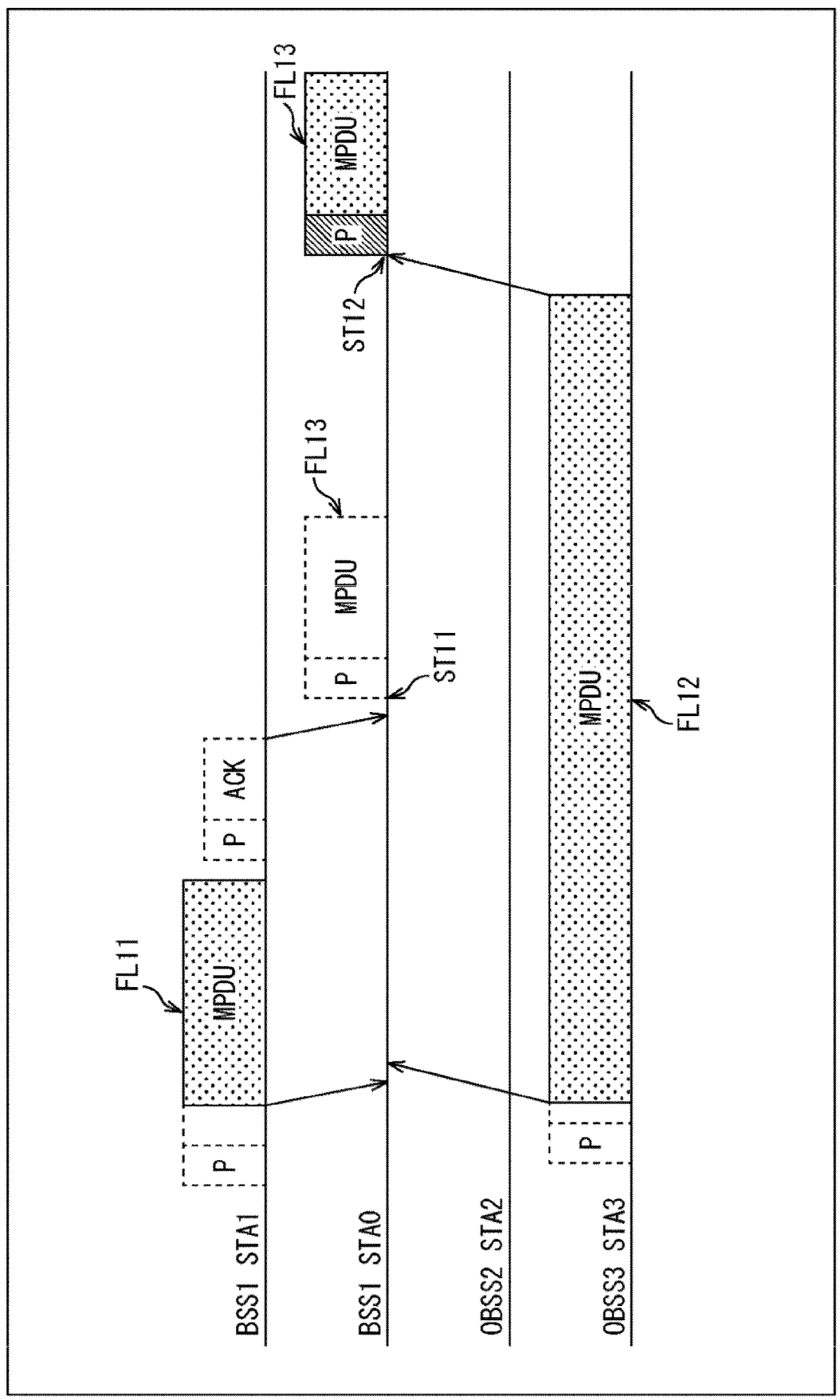
FIG. 16 is a view illustrating general carrier detection.

For example, it is assumed that the wireless communication apparatus STA1 and the wireless communication apparatus STA3 depicted in FIG. 1 perform transmission of a transmission frame and the wireless communication apparatus STA0 performs carrier detection as depicted in FIG. 16.

In the example depicted in FIG. 16, the wireless communication apparatus STA1 transmits a transmission frame FL11 and the wireless communication apparatus STA3 transmits a transmission frame FL12. Here, it is assumed that not only transmission of the transmission frame FL11 but also transmission of the transmission frame FL12 are being performed at a certain point of time and the transmission frames are frames of a general configuration. In other words, the transmission frame FL11 and the transmission frame FL12 are configured such that a midamble that includes part of header information is not inserted therein.

It is assumed that, in such a situation as just described, CSMA is started by the wireless communication apparatus STA0 in the middle of the frames. In particular, when the wireless communication apparatus STA0 performs carrier detection, the transmission frame FL11 is detected in the middle of transmission and also the transmission frame FL12 is detected in the middle of transmission.

However, since the wireless communication apparatus STA0 has failed to detect the top portion of the transmission frame FL11, namely, since the wireless communication apparatus STA0 has failed to decode the preamble of the transmission frame FL11, the wireless communication apparatus STA0 cannot acquire BSS Color information in the header information included in the preamble portion.

Therefore, the wireless communication apparatus STA0 cannot specify whether the transmission frame FL11 has been transmitted from a wireless communication apparatus in the BSS 1 of the wireless communication apparatus STA0 itself or has been transmitted from a wireless communication apparatus in a neighboring OBSS. In the present example, the transmission frame FL11 is a signal of the BSS 1 of the wireless communication apparatus STA0 itself.

Similarly, since the wireless communication apparatus STA0 has failed to detect the top portion of the transmission frame FL12, the wireless communication apparatus STA0 cannot acquire BSS Color information of the transmission frame FL12. Therefore, the wireless communication apparatus STA0 cannot specify whether the transmission frame FL12 has been transmitted from a wireless communication apparatus in the BSS 1 of the wireless communication apparatus STA0 itself or has been transmitted from a wireless communication apparatus of a neighboring OBSS. In the present example, the transmission frame FL12 is a signal of the OBSS 3 neighboring with the BSS 1 of the wireless communication apparatus STA0 itself.

In such a case as described above, if the wireless communication apparatus STA0 had succeeded in acquisition of BSS Color information, the wireless communication apparatus STA0 could have performed transmission of a transmission frame FL13, which is to be transmitted by the wireless communication apparatus STA0 itself, at a timing indicated by an arrow mark ST11 by advanced space reuse, namely, at a timing after transmission of an ACK (Acknowledgement) frame corresponding to the transmission frame FL11 to the wireless communication apparatus STA1 completed. In other words, even if transmission of a signal in the neighboring OBSS 3 was being performed after transmission of a signal in the BSS 1 of the wireless communication apparatus STA0 itself came to an end, the wireless communication apparatus STA0 could have performed transmission of the transmission frame FL13 even during transmission of the signal in the OBSS 3.

However, since actually the wireless communication apparatus STA0 has failed to specify that the transmission frame FL12 has been transmitted from a wireless communication apparatus in the OBSS, while the transmission of the transmission frame FL12 continues, the transmission frame FL13 cannot be transmitted. Consequently, the transmission frame FL13 comes to be transmitted at a timing indicated by the arrow mark ST12 after the transmission of the transmission frame FL12 comes to an end, and loss of a transmission opportunity occurs with the wireless communication apparatus STA0.

Figure 17:
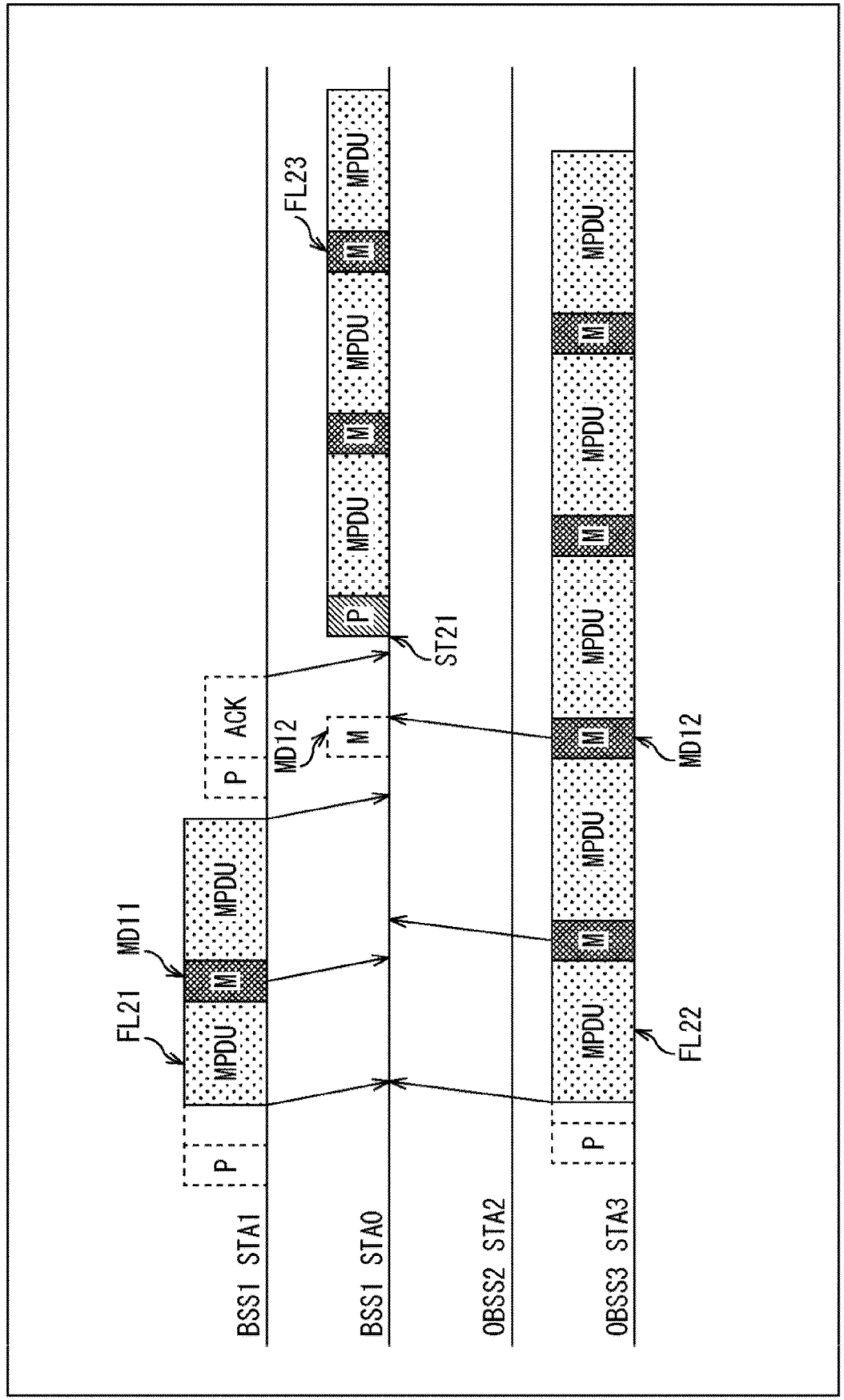
FIG. 17 is a view illustrating carrier detection in the present technology.

On the other hand, it is assumed that, for example, the wireless communication apparatus STA1 depicted in FIG. 1 and the wireless communication apparatus STA3 depicted in FIG. 3 perform transmission of a transmission frame of the configuration depicted in FIGS. 10 and 11 and the wireless communication apparatus STA0 performs carrier detection as depicted in FIG. 17.

In the example depicted in FIG. 17, the wireless communication apparatus STA1 transmits a transmission frame FL21 and the wireless communication apparatus STA3 transmits a transmission frame FL22.

Also in this example, similarly as in the example depicted in FIG. 16, at a certain point of time, a state is exhibited in which not only transmission of the transmission frame FL21 but also transmission of the transmission frame FL22 are being performed. Especially, in this example, a portion indicated by character "M" inserted in the middle of the transmission frame FL21 and the transmission frame FL22 represents a midamble, and HE MID depicted in FIG. 15 is placed in the midamble.

It is assumed that, if, in such a state as described above, the wireless communication apparatus STA0 performs carrier detection in the middle of the frames, then the transmission frame FL21 is detected in the middle of transmission and also the transmission frame FL22 is detected in the middle of transmission.

In this case, although the wireless communication apparatus STA0 has failed to decode the top portion of the transmission frame FL21, namely, the preamble portion, since the wireless communication apparatus STA0 has successfully decoded the portion of the midamble MD11 in the middle of the frame, the wireless communication apparatus STA0 can acquire BSS Color information from the midamble MD11. Consequently, the wireless communication apparatus STA0 can specify that the transmission frame FL21 is a signal of the BSS 1 of the wireless communication apparatus STA0 itself. Especially in this example, the wireless communication apparatus STA0 can acquire BSS Color information from HE MID in the midamble MD11.

Similarly, although the wireless communication apparatus STA0 has failed to decode the preamble part of the transmission frame FL22, since the wireless communication apparatus STA0 has successfully decoded the portion of the midamble MD12 in the middle of the frame, it can acquire BSS Color information from the midamble MD12. Consequently, the wireless communication apparatus STA0 can specify that the transmission frame FL22 is a signal of the OBSS 3 neighboring with the BSS 1 of the wireless communication apparatus STA0 itself.

Accordingly, it becomes possible for the wireless communication apparatus STA0 to perform signal transmission by advanced space reuse, and the wireless communication apparatus STA0 can perform transmission of a transmission frame FL23, which is to be transmitted from the wireless communication apparatus STA0 itself, at a timing indicated by an arrow mark ST21 after transmission of an ACK frame corresponding to the transmission frame FL21 is completed. In other words, even if a signal of an OBSS is detected, the wireless communication apparatus can start communication in the BSS 1 of the wireless communication apparatus itself and transmit the transmission frame FL23 without waiting for an end of the transmission of the signal of the OBSS.

Here, after the signal in the BSS 1 of the wireless communication apparatus STA0 itself becomes no more detected, transmission of the transmission frame FL23 is started within a period within which only the signal of the OBSS 3 is detected. By the foregoing, in the present technology, it is possible to achieve increase of a transmission opportunity and perform communication with a high degree of efficiency.

Further, it is assumed that, for example, the access point AP1 depicted in FIG. 1 transmits a transmission frame to the wireless communication apparatus STA0 and simultaneously the access point AP2 depicted in FIG. 1 transmits a transmission frame to the wireless communication apparatus STA2.

Here, it is assumed that the transmission frames transmitted by the access point AP1 and the access point AP2 are frames of a general configuration and are configured such that a midamble including part of header information is not inserted therein.

Figure 18:
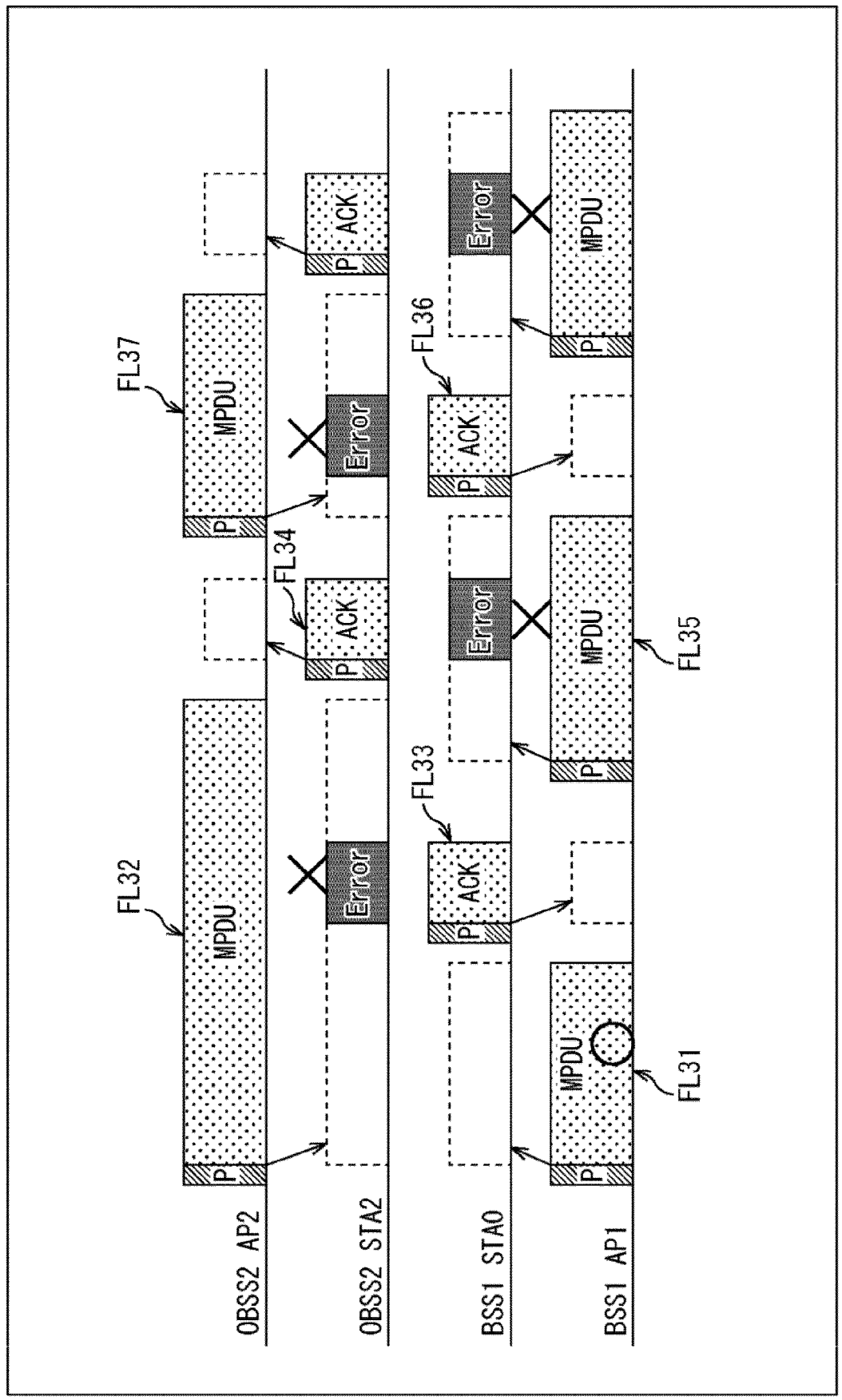
FIG. 18 is a view illustrating communication by general advanced space reuse.

In such a case, for example, if the header information of the transmission frame cannot be received correctly as depicted in FIG. 18, then the transmission efficiency (communication efficiency) is deteriorated by re-transmission of the transmission frame.

In the example depicted in FIG. 18, in the middle while the access point AP1 of the BSS 1 of the wireless communication apparatus STA0 itself is transmitting a transmission frame FL31 destined for the wireless communication apparatus STA0, the access point AP2 of the OBSS 2 transmits a transmission frame FL32 destined for the wireless communication apparatus STA2.

Here, since the wireless communication apparatus STA0 has successfully received the transmission frame FL31 correctly, the wireless communication apparatus STA0 transmits an ACK frame FL33 representing such reception to the access point AP1.

However, interference (collision) is caused by the ACK frame FL33, and the wireless communication apparatus STA2 cannot receive the transmission frame FL32 correctly and is in a state in which a communication error occurs. The wireless communication apparatus STA2 transmits an ACK frame FL34 indicative only of correctly received MPDUs of the transmission frame FL32 to the access point AP2.

Further, although, at the timing of the transmission of the ACK frame FL34, a transmission frame FL35 destined for the wireless communication apparatus STA0 is transmitted from the access point AP1, a communication errors occurs in the wireless communication apparatus STA0 due to interference between the transmission frame FL35 and the ACK frame FL34. In other words, the wireless communication apparatus STA0 is in a state in which it has failed to correctly receive the transmission frame FL35. The wireless communication apparatus STA0 transmits an ACK frame FL36 indicative only of correctly received MPDUs of the transmission frame FL35 to the access point AP1.

Furthermore, although the access point AP2 re-transmits a transmission frame FL37 corresponding to an MPDU of the transmission frame FL32, which has not been received correctly, in response to the ACK frame FL34, a communication error occurs in the wireless communication apparatus STA2 due to interference between the transmission frame FL37 and the ACK frame FL36. In short, the wireless communication apparatus STA2 is in a state in which it cannot receive the transmission frame FL37 correctly.

In such a manner, in the example depicted in FIG. 18, during communication from the access point AP1 of the BSS 1 to the wireless communication apparatus STA0, also communication from the access point AP2 of the neighboring OBSS 2 to the wireless communication apparatus STA2 is being performed. Then, although communication errors are caused by the ACK frames of the communications, since control of transmission power is not performed upon later re-transmission of transmission frames, collision of signals occurs repeatedly, resulting in deterioration of the communication efficiency.

In the case of a transmission frame of a general configuration, BSS Color information for identify the BSS, transmission power control level information (TPC Level), and parameters (Spatial Reuse) to be applied to the advanced space reuse technology cannot be obtained in the middle of a transmission frame. Therefore, in the case where collision of signals occurs, control of transmission power cannot be performed upon re-transmission or upon returning of an ACK frame, which sometimes causes repetitive collision of signals.

On the other hand, it is assumed that, for example, the access point AP1 depicted in FIG. 1 transmits a transmission frame to the wireless communication apparatus STA0 and simultaneously the access point AP2 depicted in FIG. 1 transmits a transmission frame to the wireless communication apparatus STA2 and the transmission frames are frames of the configuration depicted in FIG. 10 or 11. In other words, it is assumed that a midamble is deployed in the middle of the transmission frames as depicted in FIG. 10 or 11 and HE MID depicted in FIG. 15 is placed in the midamble.

Figure 19:
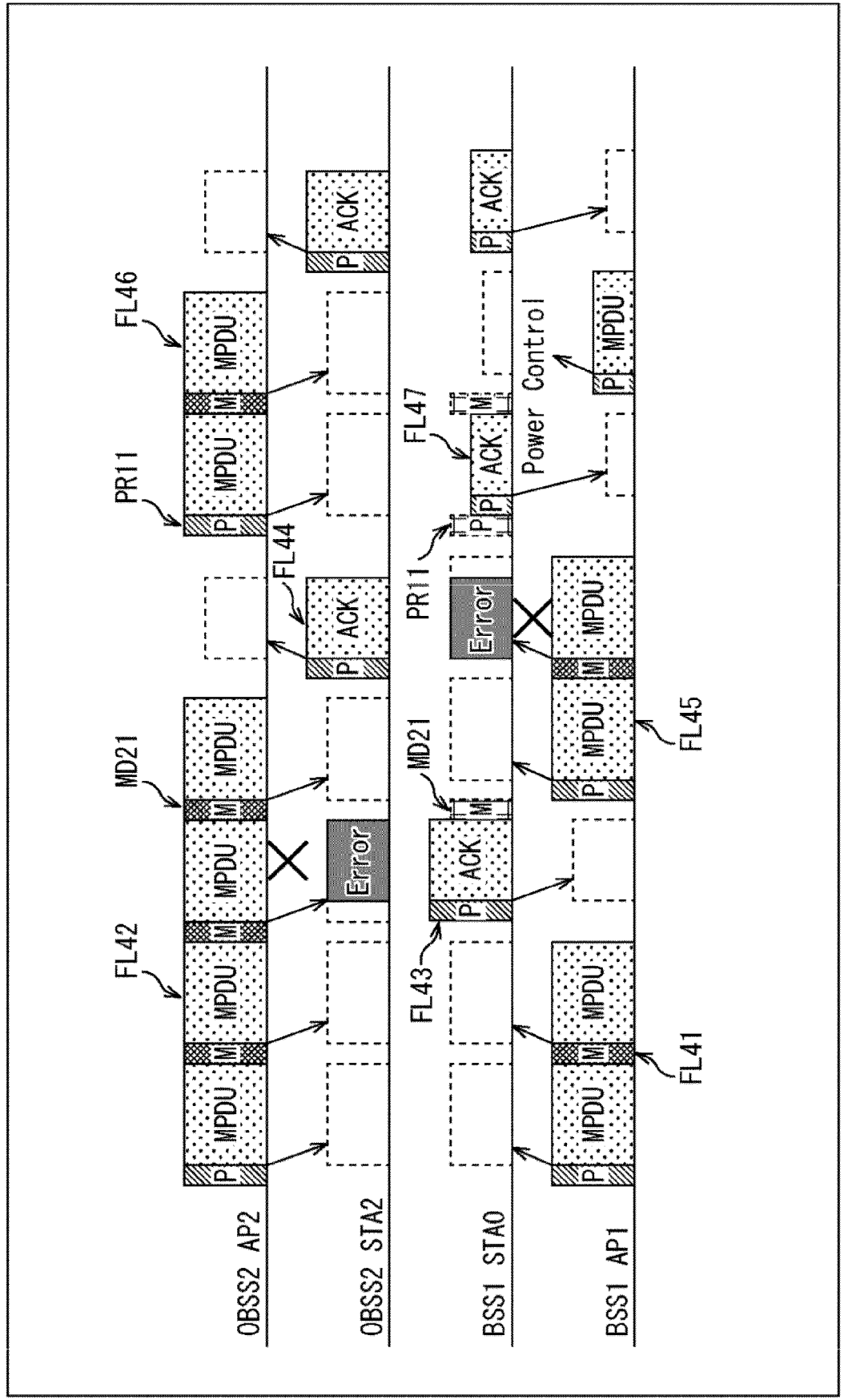
FIG. 19 is a view illustrating communication by advanced space reuse in the present technology.

If, in such a state as described above, transmission power control of a transmission frame is performed using information obtained from the midamble, for example, as depicted in FIG. 19 and a signal is transmitted by advanced space reuse, then it is possible to suppress occurrence of collision of signals and perform communication with a higher efficiency.

In the example depicted in FIG. 19, in the middle while the access point AP1 of the BSS 1 of the wireless communication apparatus STA0 itself transmits a transmission frame FL41 destined for the wireless communication apparatus STA0, the access point AP2 of the OBSS 2 transmits a transmission frame FL42 destined for the wireless communication apparatus STA2.

Here, since the wireless communication apparatus STA0 was able to correctly receive the transmission frame FL41, the wireless communication apparatus STA0 transmits an ACK frame FL43 representing such reception to the access point AP1. Further, at this time, the wireless communication apparatus STA0 has successfully received also a midamble MD21 of the transmission frame FL42.

However, interference (collision) is caused by the ACK frame FL43, and the wireless communication apparatus STA2 cannot receive the transmission frame FL42 correctly and is in a state in which a communication error occurs. The wireless communication apparatus STA2 transmits an ACK frame FL44 indicative only of correctly received MPDUs of the transmission frame LF42 to the access point AP2.

Further, although, at the timing of the transmission of the ACK frame FL44, a transmission frame FL45 destined for the wireless communication apparatus STA0 is transmitted from the access point AP1, a communication error occurs in the wireless communication apparatus STA0 due to interference (collision) of the transmission frame FL45 and the ACK frame FL44.

Furthermore, the access point AP2 re-transmits a transmission frame FL46 corresponding to the transmission frame FL42 in response to the ACK frame FL44, and the transmission frame FL46 is received correctly by the wireless communication apparatus STA2. Further, a preamble PR11 of the transmission frame FL46 is received also by the wireless communication apparatus STA0.

Since the wireless communication apparatus STA0 has failed to correctly receive the transmission frame FL45, the wireless communication apparatus STA0 transmits an ACK frame FL47 that indicates only MPDUs of the transmission frame FL45 received correctly to the access point AP1, and at this time, the wireless communication apparatus STA0 performs transmission power control of the ACK frame FL47.

In particular, the wireless communication apparatus STA0 can acquire BSS Color information, transmission power control level information and so forth on the basis of the midamble MD21 or the preamble PR11 received (detected) in advance. For example, the wireless communication apparatus STA0 can grasp from the BSS Color information that a signal of the OBSS 2 neighboring with the BSS 1 of the wireless communication apparatus STA0 itself is received.

Therefore, the wireless communication apparatus STA0 transmits the ACK frame FL47 with transmission power of such a level that no collision occurs with the transmission frame FL46 on the basis of reception power of the actually received transmission frame FL46 of the OBSS 2 and so forth. In short, the transmission power for the ACK frame FL47 is set such that the ACK frame FL47 may not have an influence on communication in the OBSS 2.

Consequently, communication that avoids collision of the transmission frame FL46 and the ACK frame FL47 with each other transmitted at substantially same timings can be implemented, and the communication efficiency can be improved.

Further, even at the access point AP1, access point AP2, and wireless communication apparatus STA2, since, by performing transmission power control similar to that in the case of the wireless communication apparatus STA0, signals of them do not interfere with each other later, the number of times of re-transmission can be minimized. In other words, coexistence of both communication in the BSS 1 and communication in the OBSS 2 can be achieved and the advanced space reuse technology can be carried out efficiently.

Figure 20:
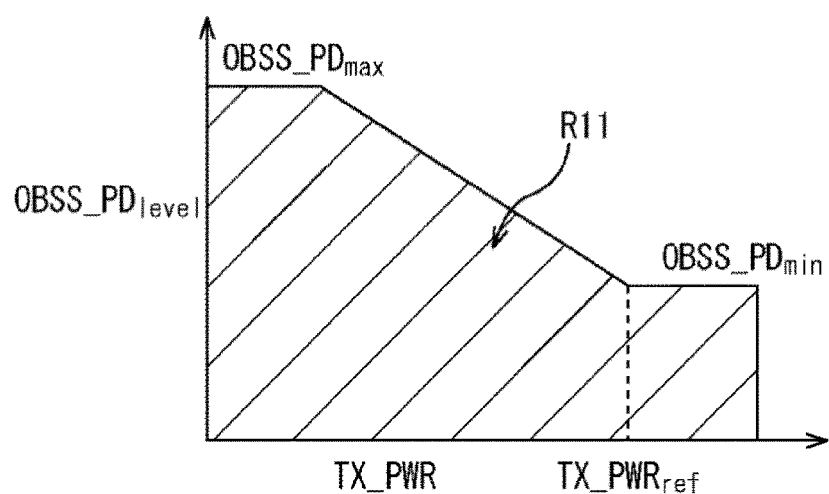
FIG. 20 is a view illustrating a relationship between reception power and transmission power.

Further, the detection threshold value for detecting a signal from an OBSS and the permissible transmission power of the wireless communication apparatus itself have, for example, such a relationship as depicted in FIG. 20. It is to be noted that, in FIG. 20, the axis of abscissa indicates the transmission power of a transmission frame transmitted from the wireless communication apparatus itself, and the axis of ordinate indicates the reception power (reception electric field strength) of a received signal from an OBSS.

In the example depicted in FIG. 20, a value $OBSS\_PD_{max}$ of the reception power is used as the detection threshold value. Further, a region R11 indicated by slanting lines indicates a range of transmission power with which, in the case where the advanced space reuse technology is applied, when a signal level (reception power) from an OBSS existing in the neighborhood is detected, it is permitted to transmit a transmission frame by transmission power restriction in the BSS of the wireless communication apparatus itself.

In particular, if the transmission power is controlled such that the position that depends upon the combination of the transmission power of a transmission frame of the wireless communication apparatus itself and the reception power of a received signal of an OBSS becomes a position in the region R11, then the transmission frame can be transmitted without having an influence on the communication in the OBSS.

Here, that an influence is not had on communication in an OBSS signifies a state in which, in the OBSS, collision between a signal of the OBSS and a signal of the BSS does not occur and the signal of the OBSS can be received correctly by a wireless communication apparatus of the destination of the signal.

In other words, even if a signal from an OBSS is detected, if the transmission power of a transmission frame is determined as transmission power equal to or lower than power determined for the reception power of a signal from the OBSS, then it is possible to transmit the transmission frame applying the advanced space reuse technology in the BSS of the wireless communication apparatus itself. This can improve the transmission efficiency.

As described above, in the present technology, a midamble that includes part of header information such as a midamble of the configuration depicted in FIG. 10 or 11 is deployed in the middle of a transmission frame, and the midamble is detected by the reception side of the transmission frame.

Consequently, on the reception side, by detecting the midamble, information (parameters) of part of the header information can be obtained not only from the preamble but also from the midamble, and a characteristic of the transmission frame can be grasped to perform communication with a higher efficiency.

In particular, by placing information of part of header information, which cannot be obtained from a transmission frame of a general configuration if the preamble part at the top of the transmission frame cannot be decoded correctly, also into a midamble, information of part of the header information can be obtained also from the middle of the transmission frame. Consequently, advanced space reuse can be carried out efficiently.

Further, by placing parameters, which are utilized in the advanced space reuse technology, into the midamble, the reception side of the transmission frame can decide in the middle of the transmission frame whether or not advanced space reuse is possible.

In particular, by placing, for example, BSS Color information and so forth as parameters to be utilized in the advanced space reuse technology into the midamble, the wireless communication apparatus can specify whether the reception frame is a signal of the BSS of the wireless communication apparatus itself or a signal of a different OBSS.

Further, in the present technology, it is made possible to specify, by detecting a midamble from presence or absence of a specific training sequence pattern, whether parameters to be utilized in the advanced space reuse technology are placed in the midamble. This makes it possible to specify, in the case where a pattern other than training sequence patterns that are utilized in the BSS of the wireless communication apparatus itself is detected, that the received signal is a signal from an overlapping OBSS.

Further, by deploying such information (midamble) at part of a subcarrier, while most part of the subcarrier is utilized for transmission, parameters to be utilized in the advanced space reuse technology during data transmission can be notified together.

Furthermore, in the present technology, in addition to the advanced space reuse technology, Duration information indicative of a duration of a transmission frame, MCS parameters indicative of a modulation method and an encoding scheme and so forth can be notified in a form placed in the midamble.

Further, by deploying a midamble in a unit of an MPDU, a transmission frame can be decoded for each MPDU, and there is no necessity to perform addition or removal of useless padding.

<Description of Transmission Process>

Now, operation of the wireless communication apparatus 11 is described.

First, a transmission process performed when the wireless communication apparatus 11 is to transmit a transmission frame is described. In particular, a transmission process by the wireless communication apparatus 11 is described with reference to a flow chart of FIG. 21.

At step S11, the network management section 53 decides whether or not transmission data is supplied thereto.

For example, in the case where the wireless communication apparatus 11 is to transmit transmission data to a different wireless communication apparatus, transmission data inputted by an application program or the like is transmitted from the apparatus controlling section 23 to the transmission buffer 52 through the interface 51 of the wireless communication module 25.

Further, simultaneously when transmission data is supplied to the transmission buffer 52, destination information indicative of a destination of transmission data, communication partner information regarding a communication partner of the wireless communication apparatus 11, and data format information indicative of a data format of transmission data are supplied from the apparatus controlling section 23 to the network management section 53 through the interface 51.

In the case where the destination information, communication partner information, and data format information are supplied from the apparatus controlling section 23, the network management section 53 decides at step S11 that transmission data is supplied thereto.

It is to be noted that the communication partner information is information regarding a wireless communication apparatus that becomes a destination of transmission data, and it can be specified, for example, from the communication destination information, a transmission frame of what configuration such as a transmission frame of the configuration depicted in FIG. 10 or FIG. 11 or the like can be processed by the wireless communication apparatus that becomes a communication partner.

The network management section 53 supplies the destination information, communication partner information, and data format information obtained in such a manner to the transmission frame construction section 54 and the wireless communication controlling section 55 as occasion demands. Further, the wireless communication controlling section 55 supplies the destination information, communication partner information, and data format information supplied from the network management section 53 to the header information generation section 56, midamble generation section 57 and so forth as occasion demands.

The transmission frame construction section 54 constructs (generates) data of a unit of an MPDU (hereinafter referred to as MPDU data) retained in the transmission buffer 52 using the information supplied from the network management section 53 as occasion demands and supplies the data to the wireless transmission processing section 59. In particular, the transmission data is placed into and supplied together with an MPDU to the wireless transmission processing section 59.

At this time, for example, the transmission frame construction section 54 generates MAC header information at the top of MPDU data on the basis of the destination information and the data format information supplied from the network management section 53. In particular, address information to be included into MAC header information is generated, for example, on the basis of the destination information.

Such MPDU data corresponds, for example, to the MPDUs indicated by characters "MPDU-1" to "MPDU-4" depicted in FIGS. 10 and 11.

It is to be noted that, in the case where the transmission frame has the configuration depicted in FIG. 11, the transmission frame construction section 54 generates and transmits not only MPDU data but also delimiter information to the wireless transmission processing section 59.

In the case where it is decided at step S11 that transmission data is not supplied, the processing returns to step S11, and the process described above is performed repetitively until transmission data is supplied.

On the other hand, in the case where it is decided at step S11 that transmission data is supplied, at step S12, the header information generation section 56 performs setting of parameters of header information on the basis of the information supplied from the wireless communication controlling section 55 and so forth.

In particular, the header information generation section 56 generates L-SIG of the configuration, for example, depicted in FIG. 5 and copies (duplicates) L-SIG to produce RL-SIG, and further generates HE-SIG-A of the configuration, for example, depicted in FIG. 6 and lines up L-SIG, RL-SIG, and HE-SIG-A to form header information. After the header information is generated in such a manner, the header information generation section 56 further generates a preamble from the obtained header information and L-STF, L-LTF, HE-STF, and HE-LTF and supplies the obtained preamble to the wireless transmission processing section 59. Further, the header information generation section 56 supplies the preamble including the header information to the midamble generation section 57.

At step S13, the network management section 53 decides on the basis of the communication partner information supplied from the apparatus controlling section 23 whether or not a wireless communication apparatus that becomes a communication partner, namely, a wireless communication apparatus that becomes a destination (transmission destination) of a transmission frame is ready for a transmission frame of the format (configuration) depicted in FIG. 10 or 11. In short, it is decided whether or not the communication partner is ready for reception of a transmission frame of the signal format having a midamble depicted in FIG. 10 or 11.

In the case where it is decided at step S13 that the communication partner is ready for such reception as described above, the network management section 53 instructs the wireless communication controlling section 55 to generate a midamble depicted in FIG. 10 or 11, and thereafter, the processing advances to step S14.

At step S14, the wireless communication controlling section 55 sets an insertion position of a midamble in response to the instruction from the network management section 53. For example, the wireless communication controlling section 55 determines a position according the configuration (format) of the transmission frame as the insertion position of a midamble on the basis of the data format information supplied from the network management section 53.

In particular, in the case where the configuration of a transmission frame indicated by the data format information is, for example, a configuration that an MPDU has a fixed length, the wireless communication controlling section 55 determines an insertion position for each midamble on the basis of the length (information length) of the preamble and the length (information length) of an MPDU having the fixed length. At this time, a midamble is deployed at a position of an OFDM symbol immediately after each MPDU.

On the other hand, in the case where the configuration of a transmission frame indicated by the data format information is, for example, a configuration that an MPDU has a variable length, the wireless communication controlling section 55 determines an insertion position for each midamble on the basis of the information length of the preamble and the information length of each MPDU indicated by the data format information. Also in this case, a midamble is deployed at the position of an OFDM symbol immediately after each MPDU.

Further, the wireless communication controlling section 55 supplies information necessary for generation of a midamble, for example, the Duration information, transmission power control level information, HE-LTF number information and so forth, to the midamble generation section 57 and instructs the midamble generation section 57 to generate a midamble.

At step S15, the midamble generation section 57 sets parameters in a midamble on the basis of the information supplied from the wireless communication controlling section 55 and the preamble supplied from the header information generation section 56. In short, the midamble generation section 57 generates a midamble, for example, of the configuration depicted in FIGS. 10 and 11.

For example, when a midamble of the configuration depicted in FIG. 10 or 11 is to be generated, a midamble including L-STF, L-LTF, L-SIG, HE MID, HE-STF, and a predetermined number of HE-LTF is generated.

Further, the wireless communication controlling section 55 instructs the midamble generation section 57 to output a midamble in response to the insertion position set at step S14. The midamble generation section 57 successively supplies the generated midambles at appropriate timings to the wireless transmission processing section 59 in accordance with the instruction of the wireless communication controlling section 55.

By generating a midamble including part of header information such as parameters to be used in the advanced space reuse technology, namely, BSS Color information and so forth in such a manner, it is possible to notify an ambient wireless communication apparatus, which receives a transmission frame beginning with the middle of the transmission frame, of a characteristic of the transmission frame. This makes it possible for the reception side to perform decoding of the transmission frame also beginning with the middle of the transmission frame.

It is to be noted that a plurality of midambles having configurations different from each other including not only midambles of the configuration depicted in FIG. 10 or 11 but also midambles of the configuration depicted in any of FIGS. 12 to 14 is prepared in advance such that the midamble generation section 57 generates a midamble of an arbitrary configuration from among the plurality of configurations. In such a case, the midamble generation section 57 selects one configuration from among the plurality of configurations under the control of the wireless communication controlling section 55 and generates midambles of the selected configuration. For example, it is sufficient if selection of a configuration for a midamble is performed on the basis of communication partner information or data format information.

After midambles are generated, the processing advances to step S16.

On the other hand, in the case where it is decided at step S13 that the communication partner is not ready, the processing thereafter advances to step S16.

If it is decided at step S13 that the communication partner is not ready or after the process at step S15 is performed, a process at step S16 is performed.

At step S16, the transmission power controlling section 58 estimates the transmission power value of the transmission frame to be transmitted from the wireless communication apparatus 11 under the control of the wireless communication controlling section 55 and sets the transmission power (transmission power) obtained by the estimation. It is to be noted that the transmission power is set to a value with which the transmission frame can be received not only by a wireless communication apparatus that is ready for reception of a transmission frame of the configuration depicted in FIG. 10 or 11 but also by a wireless communication apparatus that is not ready for such reception.

In particular, the transmission power controlling section 58 may determine transmission power designated by the wireless communication controlling section 55, for example, transmission power indicated by transmission power controlling level information placed in a midamble, as the transmission power for the transmission power.

Figure 22:
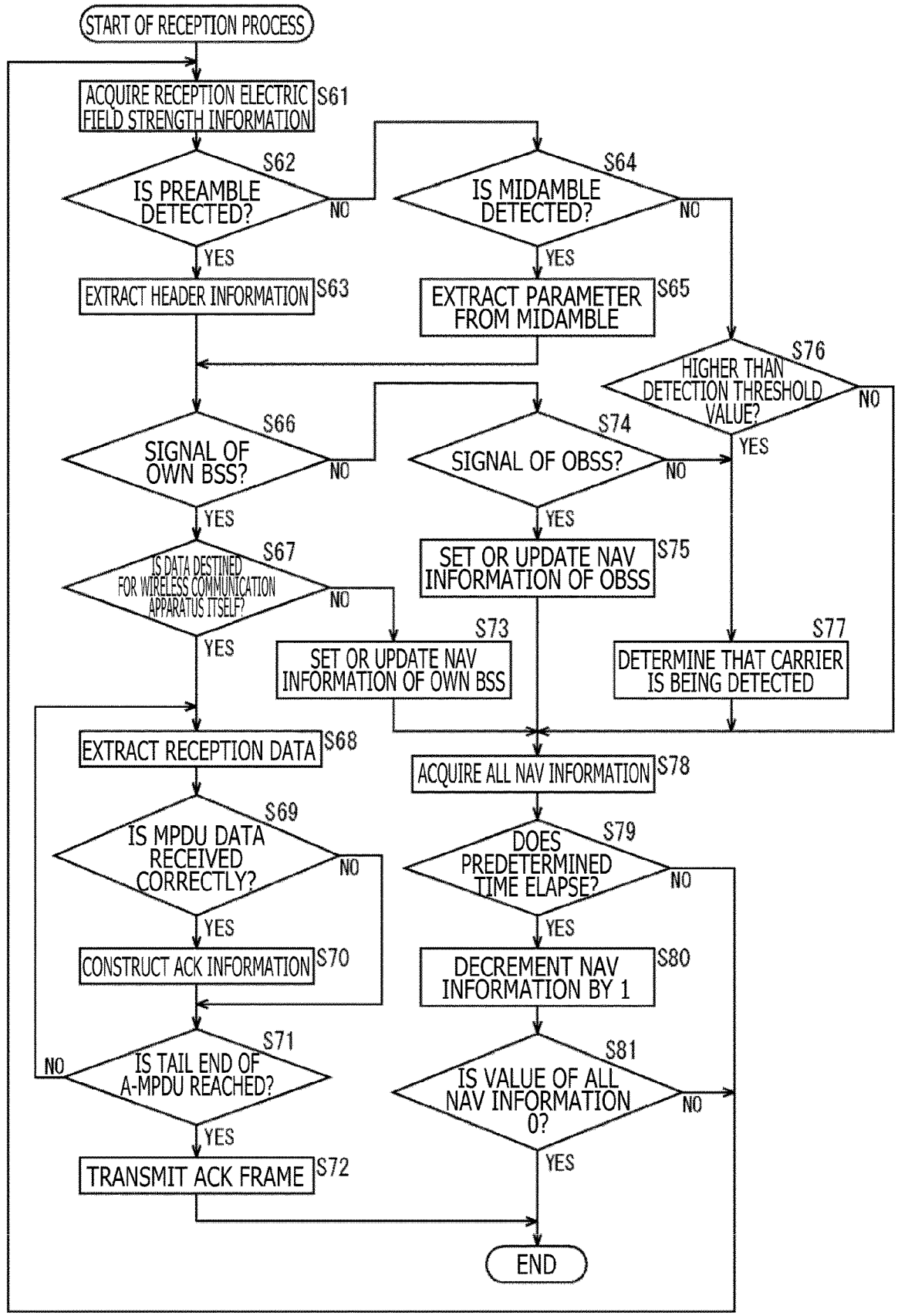
FIG. 22 is a flow chart illustrating a reception process.

Further, the transmission power controlling section 58 may determine the transmission power for a transmission frame on the basis of the reception power of a signal (reception frame) supplied from the wireless reception processing section 62 through the detection threshold value controlling section 63 and received by the wireless communication apparatus 11, namely, on the basis of reception power indicated by a reception electric field strength information obtained, for example, at step S61 of FIG. 22 hereinafter described.

Furthermore, the transmission power controlling section 58 may determine transmission power for the transmission frame on the basis of both the transmission power designated by the wireless communication controlling section 55 and the reception power indicated by the reception electric field strength information.

In particular, it is sufficient if, whichever method is used to determine transmission power, the transmission power is determined such that the relationship between the reception power and the transmission power has a relationship of a position within the region R11 that is a permissible range depicted in FIG. 20 and a wireless communication apparatus that is to receive the transmission frame can receive the transmission frame. In other words, it is sufficient if the transmission power is determined such that it has a value equal to or lower than a predetermined value that is determined by the reception power, namely, equal to or lower than a predetermined value that is determined by the region R11 depicted in FIG. 20.

At step S17, the wireless communication controlling section 55 acquires NAV (Network Allocation Vector) information indicative of a transmission inhibition period to the BSS of the wireless communication apparatus itself, namely, a period within which transmission of a transmission frame cannot be performed.

In particular, in the case where the wireless communication apparatus 11 receives a transmission frame transmitted from a different wireless communication apparatus as the reception frame, it can acquire BSS Color information placed in the preamble or a midamble of the perception frame. In other words, the wireless communication controlling section 55 can specify whether the reception frame is a signal of the BSS or a signal of an OBSS from the BSS Color information placed in the header information supplied from the header information analysis section 65 or the BSS Color information placed in HE MID supplied from the midamble detection section 64.

Then, when the reception frame is a signal of the BSS, the wireless communication controlling section 55 can specify a timing at which transmission of MPDU data, namely, of a reception frame, is completed from the Duration information placed in the MAC header information of the MPDU data extracted from the reception frame and supplied from the reception data construction section 66 through the network management section 53.

The wireless communication controlling section 55 generates, on the basis of a result of the specification of the timing at which transmission of the reception frame is completed, NAV information indicative of a period of time from a current point of time until it becomes possible for the wireless communication controlling section 55 itself to start transmission of the transmission frame after the timing as NAV information for the BSS of the wireless communication apparatus itself. Such NAV information can be considered information indicative of a communication situation in the BSS.

It is to be noted that the NAV information may be re-set every time MPDU data is received newly. Further, for generation of NAV information, Duration information in HE MID extracted from a reception frame and supplied from the midamble detection section 64, length information in the header information extracted from the reception frame and supplied from the header information analysis section 65 or the like may be used.

Here, every time a predetermined period of time elapses, the value of the NAV information of the BSS is decremented by one, and when the value of the NAV information becomes zero, it becomes possible to transmit the transmission frame of the wireless communication apparatus itself.

At step S18, the wireless communication controlling section 55 decides whether or not the transmission frame is to be transmitted by advanced space reuse.

In the case where it is decided at step S18 that the transmission frame is to be transmitted by advanced space reuse, the wireless communication controlling section 55 acquires the NAV information of an OBSS at step S19.

In particular, the wireless communication controlling section 55 generates NAV information of the OBSS from Duration information, Length information and so forth obtained from the preamble or a midamble of the reception frame that is decided as a signal of the OBSS similarly as upon acquisition of NAV information of the BSS at step S17. After the NAV information of the OBSS is obtained, the processing advances to step S20.

In such a manner, by acquiring BSS Color information from a reception frame or obtaining NAV information of the BSS or an OBSS, the wireless communication apparatus 11 can specify from which one of the BSS and an OBSS the reception frame is originated and can efficiently perform communication by advanced space reuse.

In the present technology, since BSS Color information for specifying the BSS or an OBSS is placed not only in the preamble but also in a midamble, even when reception is performed beginning with the middle of a reception frame, it can be specified whether the reception frame is a signal of the BSS or a signal of an OBSS.

Therefore, the wireless communication controlling section 55 can obtain NAV information indicative of a communication situation for each wireless network in regard to the BSS or each OBSS. In other words, the wireless communication controlling section 55 can manage, for each wireless network, the communication situation of the wireless network individually using the NAV information, namely, on the basis of BSS Color information or Duration information.

On the other hand, in the case where it is decided at step S18 that the transmission frame is not to be transmitted by advanced space reuse, the processing thereafter advances to step S20.

In the case where it is decided at step S18 that the transmission frame is not to be transmitted by advanced space reuse, or after the process at step S19 is performed, a process at step S20 is performed.

In particular, at step S20, the wireless communication controlling section 55 decides on the basis of the NAV information whether or not the transmission right for the transmission frame is acquired.

For example, in the case where the transmission frame is to be transmitted by advanced space reuse, even if the value of the NAV information of an OBSS is not zero, if the value of the NAV information of the BSS is zero and besides the transmission frame can be transmitted without having an influence on a neighboring OBSS from the transmission power and the reception power determined at step S16, the wireless communication controlling section 55 decides that the transmission right is acquired.

In particular, it is assumed that, for example, the reception frame being received by the wireless communication apparatus 11 is a signal of an OBSS and its reception power is equal to or lower than predetermined power that depends upon the transmission power and the reception power depicted in FIG. 20. In this case, the wireless communication controlling section 55 decides that the transmission right of the transmission frame is acquired, and controls transmission of the transmission frame by the wireless transmission processing section 59 such that the transmission frame is transmitted with the transmission power determined by the transmission power controlling section 58 at step S16.

Further, in the case where the transmission frame is to be transmitted, for example, without performing advanced space reuse, the wireless communication controlling section 55 decides that the transmission right is acquired when the value of the NAV information of the BSS is zero.

In the case where it is decided at step S20 that the transmission right is not acquired, the wireless communication controlling section 55 increments the value of the NAV information of the BSS and the value of the NAV information of the OBSS retained therein individually by one after lapse of a predetermined period of time, and thereafter, the processing returns to step S20. In short, the process at step S20 is performed repetitively until the transmission right is acquired.

On the other hand, in the case where it is decided at step S20 that the transmission right is acquired, the wireless transmission processing section 59 transmits the preamble of the transmission frame at step S21.

In particular, the wireless transmission processing section 59 performs a conversion process into a baseband signal, a modulation process and so forth for the preamble supplied from the header information generation section 56 and supplies a transmission signal obtained as a result of the processes to the antenna controlling section 60.

Further, the antenna controlling section 60 controls such that the transmission signal supplied from the wireless transmission processing section 59 is outputted from the antenna 61. At this time, the wireless transmission processing section 59 and the antenna controlling section 60 operate such that the transmission signal, namely, the preamble of the transmission frame, is transmitted with the transmission power set at step S16 under the control of the transmission power controlling section 58.

By the process at step S21, from within the transmission frame, the PLCP (Physical Layer Convergence Procedure) header at the top portion of the transmission frame, namely, the preamble part in which the header information configured from L-SIG, RL-SIG, and HE-SIG-A is included, is transmitted.

At step S22, the wireless transmission processing section 59 transmits MPDU data of the transmission frame.

In particular, the wireless transmission processing section 59 performs a conversion process into a baseband signal, a modulation process and so forth for the MPDU data supplied from the transmission frame construction section 54 and supplies a transmission signal obtained as a result of the processes to the antenna controlling section 60.

Further, the antenna controlling section 60 controls such that the transmission signal supplied from the wireless transmission processing section 59 is outputted from the antenna 61. At this time, the wireless transmission processing section 59 and the antenna controlling section 60 operate such that the transmission signal, namely, the MPDU data of the transmission frame, is transmitted with the transmission power set at step S16 under the control of the transmission power controlling section 58.

For example, in the case where the transmission frame depicted in FIG. 10 is to be transmitted, when the process at step S22 is performed immediately after the preamble is transmitted, the MPDU data deployed immediately after the preamble and indicated by character "MPDU-1" is transmitted.

It is to be noted that, in the case also where delimiter information is to be transmitted together with the MPDU data, after the delimiter information is transmitted, the MPDU data deployed immediately after the delimiter information is transmitted.

At step S23, the wireless communication controlling section 55 decides on the basis of a result of setting of the insertion position for a midamble determined by the process at step S14 whether or not a timing at which the midamble is to be outputted comes.

In the case where it is decided at step S23 that the timing at which the midamble is to be outputted comes, the wireless communication controlling section 55 instructs the midamble generation section 57 to transmit the midamble, and thereafter, the processing advances to step S24.

At step S24, the wireless transmission processing section 59 transmits the midamble of the transmission frame.

In particular, the midamble generation section 57 supplies the midamble to be transmitted in accordance with the instruction of the wireless communication controlling section 55 to the wireless transmission processing section 59.

The wireless transmission processing section 59 performs a conversion process into a baseband signal, a modulation process and so forth for the midamble supplied from the midamble generation section 57 and supplies a transmission signal obtained as a result of the processes to the antenna controlling section 60.

Further, the antenna controlling section 60 controls such that the transmission signal supplied from the wireless transmission processing section 59 is outputted from the antenna 61. At this time, the wireless transmission processing section 59 and the antenna controlling section 60 operate such that the transmission signal, namely, the midamble of the transmission frame, is transmitted with the transmission power set at step S16 under the control of the transmission power controlling section 58.

After the midamble is transmitted in such a manner, the processing thereafter returns to step S22 and the processes described above are repeated.

On the other hand, in the case where it is decided at step S23 that the timing at which a midamble is to be transmitted does not come as yet, the wireless communication controlling section 55 decides at step S25 whether or not the tail end of A-MPDU is reached, namely, whether or not the tail end of the transmission frame is reached.

In the case whether it is decided at step S25 that the tail end is not reached, since transmission of MPDU data or a midamble is to be performed further, the processing returns to step S22 and the processes described above are performed repetitively.

On the other hand, in the case where it is decided at step S25 that the tail end is reached, the wireless reception processing section 62 receives an ACK frame at step S26.

In particular, if the transmission frame transmitted by the wireless communication apparatus 11 is received by a wireless communication apparatus of the communication partner, then the wireless communication apparatus of the communication partner transmits an ACK frame destined for the wireless communication apparatus 11.

The wireless reception processing section 62 determines that the reception frame supplied from the antenna 61 through the antenna controlling section 60 is received if the reception power of the reception frame is equal to or higher than the detection threshold value supplied from the detection threshold value controlling section 63. In short, detection of the preamble and a midamble from the reception frame is performed.

The midamble detection section 64 detects a midamble from the reception frame by detecting a predetermined sequence pattern at the midamble part from the reception frame received by the wireless reception processing section 62. If a midamble is detected, then the midamble detection section 64 supplies L-SIG, HE MID and so forth extracted from the midamble together with a result of the detection to the wireless communication controlling section 55. The midamble detection section 64 supplies L-SIG, HE MID and so forth extracted from the midamble also to the header information analysis section 65 as occasion demands.

The header information analysis section 65 detects the preamble from the reception frame by detecting a predetermined sequence pattern at the preamble part from the reception frame received by the wireless reception processing section 62 suitably using the information supplied from the midamble detection section 64 and so forth. If the preamble is detected, then the header information analysis section 65 supplies header information and so forth extracted from the preamble to the wireless communication controlling section 55 together with a result of the detection. The header information analysis section 65 supplies the header information and so froth extracted from the preamble also to the reception data construction section 66.

Further, the reception data construction section 66 extracts the reception data placed in the MPDU data from the reception frame received by the wireless reception processing section 62 on the basis of the header information and so forth supplied from the header information analysis section 65, and supplies the reception data to the reception buffer 67 and the network management section 53.

In the case where the reception frame received in such a manner is an ACK frame, since information indicative of which reception data, namely, which MPDU data, is received correctly, is obtained, the network management section 53 supplies the information obtained from the ACK frame to the wireless communication controlling section 55.

At step S27, the wireless communication controlling section 55 decides whether or not an ACK frame indicating that all of the transmission data (MPDU data) of the transmission frame having been transmitted are received correctly has been received.

For example, in the case where information indicating that all MPDU data included in the transmission frame transmitted already are received correctly is received from the network management section 53, the wireless communication controlling section 55 decides that an ACK frame indicating such correct reception is received. With this, the transmission frame is received correctly by the wireless communication apparatus of the communication partner.

In the case where it is decided at step S27 that an ACK frame indicating that the transmission frame is received correctly is not received, the processing returns to step S12 and the processes described above are performed repeatedly.

In this case, since the transmission frame has not been received correctly, the transmission frame comes to be re-transmitted. However, in this case, since control of the transmission power is performed appropriately at step S16, communication is performed more efficiently.

On the other hand, in the case where it is decided at step S27 that an ACK frame indicating that the transmission frame is received correctly is received, since the transmission frame has been received correctly by the communication partner side, the transmission process is ended.

In this manner, the wireless communication apparatus 11 places and transmits part of header information into and together with a midamble. Consequently, communication can be performed with a higher efficiency.

<Description of Reception Process>

Now, a reception process that is performed when the wireless communication apparatus 11 receives a reception from transmitted from a communication partner is described. In particular, the reception process by the wireless communication apparatus 11 is described below with reference to a flow chart of FIG. 22.

After a reception process is started, the wireless communication apparatus 11 first starts operation of the blocks that function as a receiver of the wireless communication apparatus 11 itself in order to receive a reception frame destined for the wireless communication apparatus 11 itself.

Then at step S61, the wireless reception processing section 62 detects reception power, namely, a reception electric field strength, of a reception frame supplied from the antenna 61 through the antenna controlling section 60 and acquires reception electric field strength information indicative of the reception power (signal detection level).

At this time, for example, if the reception power of the reception frame determined (detected) by the wireless reception processing section 62 is equal to or higher than a detection threshold value supplied from the detection threshold value controlling section 63, then detection of the preamble and a midamble of the reception frame is performed. It is to be noted that, more particularly, detection of the preamble and a midamble is performed also from a reception frame whose reception power is lower than the detection threshold value.

The midamble detection section 64 detects a midamble from the reception frame by detecting a predetermined sequence pattern at a midamble part from the reception frame received by the wireless reception processing section 62.

Further, the header information analysis section 65 detects the preamble from the reception frame by detecting a predetermined sequence pattern at the preamble part from the reception frame received by the wireless reception processing section 62 suitably using information supplied from the midamble detection section 64 and so forth.

It is to be noted that the detection threshold value controlling section 63 performs a process for setting a preamble detection threshold value for the BSS from a predetermined reception electric field strength level and determining a detection threshold value according to the slope from $OBSS\_PD_{max}$ to $OBSS\_PD_{min}$ in response to the transmission power for the frame to be transmitted, described hereinabove with reference to FIG. 20 in regard to the preamble detection threshold value for an OBSS.

For example, in the case where preamble detection is decided first from the threshold value for the reception power of a reception frame of the BSS supplied from the wireless reception processing section 62 and then it is decided that the reception signal is a signal from an OBSS, the detection threshold value controlling section 63 carries out decision of the detection threshold value for OBSS_PD in response to the transmission power for a frame to be transmitted.

Here, the reception power of the reception frame of the BSS or an OBSS supplied from the wireless reception processing section 62 is reception power indicated by the reception electric field strength information determined by the process at step S61. Whether the reception power indicated by the reception electric field strength information is that of a signal of the BSS or a signal of an OBSS can be specified from BSS Color information supplied from the wireless communication controlling section 55.

At step S62, the header information analysis section 65 decides whether or not the preamble is detected from the reception frame.

In the case where it is decided at step S62 that the preamble is detected, the processing advances to step S63.

At step S63, the header information analysis section 65 extracts header information and so forth from the detected preamble, supplies the header information and so forth to the wireless communication controlling section 55 and the reception data construction section 66, and then the processing advances to step S66. Consequently, the PLCP header, namely, header information including L-SIG, RL-SIG, and HE-SIG-A, is extracted from the preamble of the reception frame.

On the other hand, in the case where it is decided at step S62 that the preamble is not detected, the midamble detection section 64 decides whether or not a midamble is detected from the reception frame at step S64.

In the case where it is decided at step S64 that a midamble is detected, the processing thereafter advances to step S65.

At step S65, the midamble detection section 64 extracts various parameters from the detected midamble, and the processing thereafter advances to step S66.

In particular, the midamble detection section 64 extracts various parameters placed in L-SIG and HE MID from the midamble and supplies the parameters to the wireless communication controlling section 55 and the header information analysis section 65.

Further, the various parameters placed in L-SIG and HE MID obtained by the midamble detection section 64 are supplied also to the reception data construction section 66 through the header information analysis section 65 as occasion demands. Since BSS Color information and so forth are obtained as parameters placed, for example, in L-SIG and HE MID are obtained, even when a reception frame is detected in the middle of the frame, the midamble detection section 64 can specify whether the reception frame is a signal of the BSS or a signal of an OBSS, and communication can be performed with a higher efficiency.

Further, since parameters and so forth relating to the advanced space reuse technology can be obtained from L-SIG and HE MID of the midamble, even when a reception frame is received beginning with the middle of the reception frame, decoding of the reception frame, namely, extraction of reception data, can be performed.

Further, if a preamble and a midamble are detected from the reception frame, then the reception data construction section 66 analyzes MAC header information placed in MPDU data from the reception frame received by the wireless reception processing section 62 on the basis of the header information and so forth supplied from the header information analysis section 65. Consequently, it is possible to acquire address information indicated by character "Address" in the MAC header information depicted, for example, in FIG. 7, and the reception data construction section 66 supplies the acquired address information to the wireless communication controlling section 55 through the network management section 53.

After the process at step S63 or step S65 is performed, the wireless communication controlling section 55 decides at step S66 whether or not the received reception frame is a signal of the BSS of the wireless communication apparatus 11 itself.

For example, in the case where BSS Color information included in HE-SIG-A in the header information is supplied from the header information analysis section 65, when the BSS Color information is information indicative of the BSS to which the wireless communication apparatus 11 belongs, the wireless communication controlling section 55 decides that the reception signal is a signal of the BSS wireless communication apparatus 11 itself.

On the other hand, in the case where BSS Color information included in HE-MID is supplied from the midamble detection section 64, when the BSS Color information is information indicative of the BSS to which the wireless communication apparatus 11 belongs, the wireless communication controlling section 55 decides that the reception signal is a signal of the BSS of the wireless communication apparatus 11 itself.

In the case where it is decided at step S66 that the reception signal is a signal of the BSS of the wireless communication apparatus 11 itself, the wireless communication controlling section 55 decides at step S67 whether or not the received reception frame is data (reception frame) destined for the wireless communication apparatus 11 itself.

For example, in the case where the address information supplied from the reception data construction section 66 through the network management section 53 indicates the wireless communication apparatus itself, namely, the wireless communication apparatus 11 itself, the wireless communication controlling section 55 decides that the reception signal is data destined for the wireless communication apparatus itself.

In the case where it is decided at step S67 that the reception signal is data destined for the wireless communication apparatus itself, the processing advances to step S68.

At step S68, the reception data construction section 66 extracts the reception data placed in one MPDU data from the reception frame received by the wireless reception processing section 62 on the basis of the header information and so forth supplied from the header information analysis section 65. In short, extraction of the reception data in a unit of an MPDU is performed.

The reception data construction section 66 supplies the extracted reception data to the network management section 53 and the reception buffer 67. The reception data retained in the reception buffer 67 is supplied to the apparatus controlling section 23 through the interface 51.

At step S69, the reception data construction section 66 decides whether or not MPDU data, namely, reception data in a unit of an MPDU, is received correctly as a result of step S68.

In the case where it is decided at step S69 that MPDU data is successfully received correctly, the reception data construction section 66 constructs (generates) ACK information indicating that the MPDU data is received correctly and supplies the ACK information to the wireless communication controlling section 55 through the network management section 53 at step S70. After the ACK information is generated, the processing advances to step S71.

On the other hand, in the case where it is decided at step S69 that the MPDU data is not received correctly, the process at step S70 is not performed, and the processing advances to step S71.

If it is decided at step S69 that the MPDU data is not received correctly or after the process at step S70 is performed, a process at step S71 is performed.

In particular, at step S71, the wireless communication controlling section 55 decides whether or not the tail end of aggregate A-MPDU is reached, namely, whether or not the tail end of the reception frame is reached, on the basis of the header information and so forth supplied from the header information analysis section 65 and the midamble detection section 64.

In the case where it is decided at step S71 that the tail end of A-MPDU is not reached as yet, the processing returns to step S68 and the processes described above are performed repeatedly.

On the other hand, in the case where it is decided at step S71 that the tail end of A-MPDU is reached, the wireless transmission processing section 59 transmits the ACK frame at step S72.

In particular, the wireless communication controlling section 55 controls the header information generation section 56 on the basis of the ACK information supplied from the reception data construction section 66 to generate a preamble for the ACK frame and supply the preamble to the wireless transmission processing section 59. Further, the network management section 53 controls the transmission frame construction section 54 on the basis of the ACK information supplied from the reception data construction section 66 to generate MPDU data for the ACK frame and supply the MPDU data to the wireless transmission processing section 59 as occasion demands.

The wireless transmission processing section 59 performs a conversion process into a baseband signal, a modulation process and so forth for the preamble supplied from the header information generation section 56 and the ACK frame configured from the MPDU data supplied from the transmission frame construction section 54 and supplies an ACK frame obtained as a result of the processes to the antenna controlling section 60.

Further, the antenna controlling section 60 controls such that the ACK frame supplied from the wireless transmission processing section 59 is outputted from the antenna 61. At this time, the wireless transmission processing section 59 and the antenna controlling section 60 operate such that the ACK frame is transmitted with the transmission power set, for example, in a similar manner as at step S16 of FIG. 21 under the control of the transmission power controlling section 58.

For example, the ACK frame supplied from the wireless transmission processing section 59 includes information indicative of correctly received MPDU data. After the ACK frame is transmitted in such a manner as described above, the reception process is ended.

On the other hand, in the case where it is decided at step S67 that the reception signal is not data destined for the wireless communication apparatus itself, namely, in the case where, although the BSS Color information included in the reception frame is information indicative of the BSS of the wireless communication apparatus itself, the reception frame is not destined for the wireless communication apparatus itself, the processing advances to step S73.

At step S73, the wireless communication controlling section 55 sets or updates NAV information of the BSS of the wireless communication apparatus itself.

Figure 21:
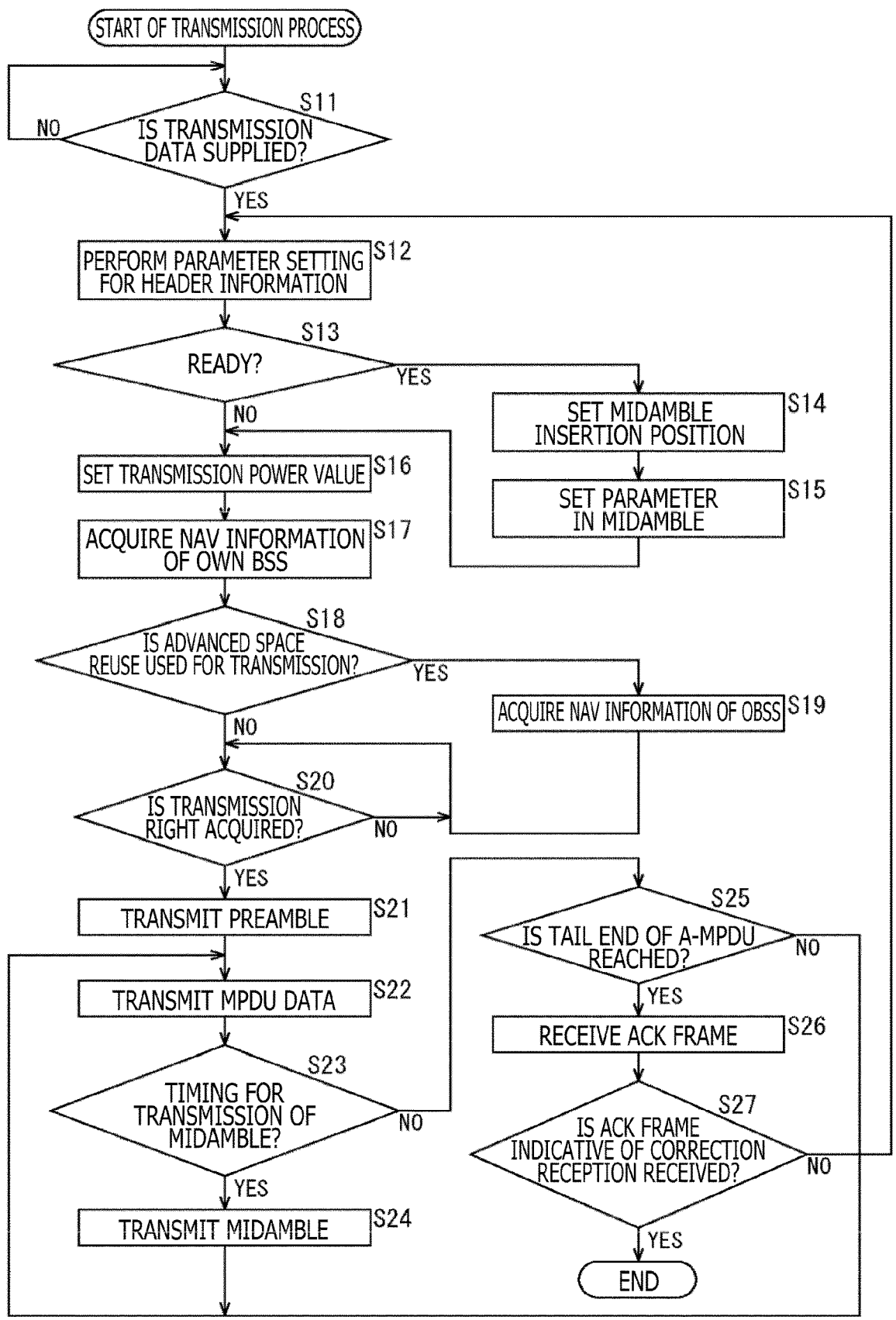
FIG. 21 is a flow chart illustrating a transmission process.

In particular, in the case where the wireless communication controlling section 55 does not retain NAV information of the BSS of the wireless communication apparatus itself, it generates NAV information of the BSS of the wireless communication apparatus itself in a similar manner as in the case at step S17 of FIG. 21.

In particular, NAV information of the BSS is generated, for example, from the Duration information placed in the MAC header information of the MPDU data supplied from the reception data construction section 66 through the network management section 53, Duration information in HE MID supplied from the midamble detection section 64, length information supplied from the header information analysis section 65 and so forth.

On the other hand, in the case where the wireless communication controlling section 55 already retains NAV information of the BSS of the wireless communication apparatus itself, the wireless communication controlling section 55 updates the retained NAV information on the basis of the Duration information and so forth placed in the MAC header information of the MPDU data received newly.

In the case where, although the BSS Color information included in the reception frame is information indicative of the BSS of the wireless communication apparatus itself, the reception frame is not destined for the wireless communication apparatus itself, communication for transmission and reception of the reception frame continues to be performed till time indicated by the Duration information placed in the MAC header information.

After the NAV information of the BSS of the wireless communication apparatus itself is generated or updated in such a manner, the processing advances to step S78.

On the other hand, in the case where it is decided at step S66 that the reception signal is not a signal of the BSS of the wireless communication apparatus itself, the wireless communication controlling section 55 decides at step S74 whether or not the received reception frame is a signal of an OBSS.

For example, in the case where BSS Color information included in HE-SIG-A in the header information is supplied from the header information analysis section 65, the wireless communication controlling section 55 decides that the BSS Color information is information indicative of a different BSS, to which the wireless communication apparatus 11 does not belong, namely, indicative of an OBSS, the wireless communication controlling section 55 decides that the reception signal is a signal of an OBSS.

Further, in the case where BSS Color information included in HE-MID is supplied from the midamble detection section 64, the wireless communication controlling section 55 decides that the reception signal is a signal of an OBSS when the BSS Color information is information indicative of an OBSS to which the wireless communication apparatus 11 does not belong.

In the case where it is decided at step S74 that the reception signal is a signal of an OBSS, the wireless communication controlling section 55 sets or updates the NAV information of the OBSS at step S75.

In particular, at step S75, a process similar to that at step S73 is performed to generate or update NAV information of the OBSS. It is to be noted that the NAV information of the OBSS may be generated for each OBSS or only NAV information of an OBSS whose duration is longest among a plurality of OBSSes may be set (generated) and managed.

Similarly as upon transmission processing, also upon reception processing, by managing NAV information for each of a wireless network in regard to the BSS and each OBSS, the wireless communication controlling section 55 can manage the communication situation of the wireless network individually using the NAV information.

After the NAV information of the OBSS is set or updated, the processing advances to step S78.

On the other hand, in the case where it is decided at step S74 that the reception signal is not a signal of an OBSS, the processing thereafter advances to step S77.

On the other hand, in the case where it is decided at step S64 that a midamble is not detected, the processing advances to step S76.

At step S76, the wireless communication controlling section 55 decides whether or not the reception power of the reception frame received by the wireless reception processing section 62 is higher than a detection threshold value determined by the detection threshold value controlling section 63.

In the case where it is decided at step S76 that the reception power of the reception frame is higher than the detection threshold value, the wireless communication controlling section 55 determines at step S77 that it is in a state in which it is detecting a carrier, and thereafter, the processing advances to step S78.

In this case, although none of a preamble and a midamble are detected in regard to the reception frame, since the wireless communication controlling section 55 is in a state in which a signal having high reception power is detected, the wireless communication controlling section 55 determines that this is a state during carrier detection and continuously performs the process for detecting a preamble or a midamble from the signal being received (reception frame). It is to be noted that, in the state in which the carrier is being detected, the wireless communication apparatus 11 cannot perform transmission of a transmission frame.

On the other hand, in the case where it is decided at step S76 that the reception power is equal to or lower than the detection threshold value, the wireless communication apparatus 11 does not determine that the carrier is being detected, and the processing thereafter advances to step S78.

Further, in the case where the process at step S73 is performed, in the case where the process at step S75 is performed, in the case where the process at step S77 is performed or in the case where it is decided at step S76 that the reception power is equal to or lower than the detection threshold value, a process at step S78 is performed.

In particular, at step S78, the wireless communication controlling section 55 acquires all NAV information. In particular, the wireless communication controlling section 55 reads out the NAV information of the BSS of the wireless communication apparatus itself obtained at step S73 and the NAV information of the OBSS obtained at step S75 and grasps the communication situation of the BSS and the OBSS indicated by the NAV information.

At step S79, the wireless communication controlling section 55 decides whether or not a predetermined period of time elapses after the NAV information is updated last.

In the case where it is decided at step S79 that the predetermined period of time does not elapse as yet, the processing returns to step S61 and the processes described above are performed repeatedly.

On the other hand, in the case where it is decided at step S79 that the predetermined period of time elapses, the wireless communication controlling section 55 subtracts one from the NAV information of the BSS of the wireless communication apparatus itself and the NAV information of the OBSS at step S80. In other words, the values of the NAV information are decremented.

At step S81, the wireless communication controlling section 55 decides whether or not the values of all NAV information are zero.

In the case where it is decided at step S81 that the values of all NAV information are not zero, the processing returns to step S61 and the processes described above are performed repeatedly.

On the other hand, in the case where it is decided at step S81 that the values of all NAV information are zero, the reception process is ended.

In such a manner, the wireless communication apparatus 11 detects a midamble in which part of header information is placed from a reception frame and extracts part of the header information from the midamble. Consequently, communication can be performed with a higher efficiency.

<Configuration Example of Computer>

Incidentally, while the series of processes described above can be executed by hardware, it may otherwise be executed by software. In the case where the series of processes is executed by software, a program that constructs the software is installed into a computer. Here, as the computer, a computer incorporated in hardware for exclusive use, for example, a personal computer for universal use that can execute various functions by installing various programs, and so forth are available.

FIG. 23 is a block diagram depicting a configuration example of hardware of a computer that executes the series of processes described hereinabove in accordance with a program.

In the computer, a CPU 501, a ROM (Read Only Memory) 502, and a RAM (Random Access Memory) 503 are connected to each other by a bus 504.

To the bus 504, an input/output interface 505 is connected further. To the input/output interface 505, an inputting section 506, an outputting section 507, a recording section 508, a communication section 509, and a drive 510 are connected.

The inputting section 506 is configured from a keyboard, a mouse, a microphone, an imaging element and so forth. The outputting section 507 is configured from a display, a speaker and so forth. The recording section 508 is configured from a hard disk, a nonvolatile memory and so forth. The communication section 509 is configured from a network interface or the like. The drive 510 drives a removable recording medium 511 such as a magnetic disk, an optical disk, a magneto-optical disk, a semiconductor memory or the like.

In the computer configured in such a manner as described above, the CPU 501 loads a program recorded, for example, in the recording section 508 into the RAM 503 through the input/output interface 505 and the bus 504 to perform the series of processes described above.

The program that is executed by the computer (CPU 501) can be recorded into and provided as the removable recording medium 511, for example, as a package medium or the like. Further, the program can be provided through a wired or wireless transmission medium such as a local area network, the Internet, a digital satellite broadcast or the like.

In the computer, a program can be installed into the recording section 508 through the input/output interface 505 by mounting a removable recording medium 511 on the drive 510. Further, the program can be received by the communication section 509 through a wired or wireless transmission medium and installed into the recording section 508. Further, the program can be installed in advance into the ROM 502 or the recording section 508.

It is to be noted that the program executed by the computer may be a program in which processes are performed in time series in accordance with the order described herein or may be a program in which processes are executed in parallel or at a necessary timing such as, for example, when the program is called or the like.

Further, the embodiment of the present technology is not limited to the embodiment described hereinabove, and various alterations are possible without departing from the subject matter of the present disclosure.

For example, the present technology can assume a configuration for cloud computing in which one function is shared and processed cooperatively by a plurality of apparatus through a network.

Further, the steps described hereinabove in connection with the flow charts can be executed by a single apparatus or can be executed by sharing by a plurality of apparatus.

Furthermore, where one step includes a plurality of processes, the plurality of processes included in the one step can be executed by a single apparatus and also can be executed by sharing by a plurality of apparatus.

It is to be noted that the present technology can assume such a configuration as described below.

(1)

A wireless communication apparatus, including:

a preamble generation section configured to generate a preamble that is to be deployed at a top of a transmission frame and includes header information;

a midamble generation section configured to generate a midamble that is to be deployed in a middle of the transmission frame and includes information of at least part of the header information; and a wireless transmission processing section configured to transmit the transmission frame including the preamble and the midamble.

(2)

The wireless communication apparatus according to (1), in which the midamble includes a field of at least part of fields included in the preamble other than the header information.

(3)

The wireless communication apparatus according to (2), in which the fields other than the header information include fields for training.

(4)

The wireless communication apparatus according to (2) or (3), in which the deployment in the midamble and the deployment in the preamble of the field that is included in common in the midamble and the preamble are same as each other.

(5)

The wireless communication apparatus according to (2) or (3), in which the deployment in the midamble and the deployment in the preamble of the field that is included in common in the midamble and the preamble are different from each other.

(6)

The wireless communication apparatus according to any one of (1) to (4), in which the midamble generation section generates the midamble of one configuration from among a plurality of the midambles having configurations different from each other.

(7)

The wireless communication apparatus according to any one of (1) to (6), in which the midamble is deployed at each of intervals of a data unit included in the transmission frame.

(8)

The wireless communication apparatus according to (7), in which, in a case where the data unit has a variable length, delimiter information indicative of an information length of the data unit is deployed immediately preceding to the data unit in the transmission frame.

(9)

The wireless communication apparatus according to any one of (1) to (8), in which the midamble includes at least any one of information indicative of transmission power of the transmission frame, information for advanced space reuse, information for specifying a wireless network to which the wireless communication apparatus belongs, encoding scheme information of the transmission frame, or information indicative of a duration of the transmission frame.

(10)

The wireless communication apparatus according to any one of (1) to (9), further including:

a wireless reception processing section configured to detect reception power of a received reception frame; and a transmission power controlling section configured to control transmission power of the transmission frame based on the reception power.

(11)

The wireless communication apparatus according to (10), in which the transmission power controlling section controls the transmission power of the transmission frame based on information included in the midamble of the transmission frame and indicative of transmission power of the transmission frame and the reception power.

(12)

The wireless communication apparatus according to (10) or (11), in which, in a case where the reception frame is a signal of a wireless network different from a wireless network to which the wireless communication apparatus belongs and the reception power is equal to or lower than a given value, the wireless transmission processing section transmits the transmission frame with the transmission power determined by the transmission power controlling section.

(13)

A wireless communication method, including the steps of:

generating a preamble that is to be deployed at a top of a transmission frame and includes header information;

generating a midamble that is to be deployed in a middle of the transmission frame and includes information of at least part of the header information; and transmitting the transmission frame including the preamble and the midamble.

(14)

A program for causing a computer to execute a process including the steps of:

generating a preamble that is to be deployed at a top of a transmission frame and includes header information;

generating a midamble that is to be deployed in a middle of the transmission frame and includes information of at least part of the header information; and transmitting the transmission frame including the preamble and the midamble.

(15)

A wireless communication apparatus, including:

a wireless reception processing section configured to receive a reception frame that includes a preamble deployed at a top of the reception frame and including header information and a midamble deployed in a middle of the frame and including information of at least part of the header information; and a midamble detection section configured to detect the midamble from the reception frame and extract the information of the at least part of the header information included in the midamble.

(16)

The wireless communication apparatus according to (15), in which the midamble includes a field of at least part of fields included in the preamble other than the header information.

(17)

The wireless communication apparatus according to (16), in which the fields other than the header information include fields for training.

(18)

The wireless communication apparatus according to (16) or (17), in which the deployment in the midamble and the deployment in the preamble of the field that is included in common in the midamble and the preamble are same as each other.

(19)

The wireless communication apparatus according to (16) or (17), in which the deployment in the midamble and the deployment in the preamble of the field that is included in common in the midamble and the preamble are different from each other.

(20)

The wireless communication apparatus according to any one of (15) to (19), in which the midamble is deployed at each of intervals of a data unit included in the reception frame.

(21)

The wireless communication apparatus according to (20), in which, in a case where the data unit has a variable length, delimiter information indicative of an information length of the data unit is deployed immediately preceding to the data unit in the reception frame.

(22)

The wireless communication apparatus according to any one of (15) to (21), in which the midamble includes at least any one of information indicative of transmission power of the reception frame, information for advanced space reuse, information for specifying a wireless network to which a transmission source of the reception frame belongs, encoding scheme information of the reception frame, or information indicative of a duration of the reception frame.

(23)

The wireless communication apparatus according to any one of (15) to (22), in which the wireless reception processing section detects reception power of the reception frame, and the wireless communication apparatus further includes a transmission power controlling section configured to control transmission power of a transmission frame to be transmitted later based on the reception power.

(24)

The wireless communication apparatus according to (23), in which the transmission power controlling section controls the transmission power of the transmission frame based on information included in the midamble of the transmission frame and indicative of transmission power of the transmission frame and the reception power.

(25)

The wireless communication apparatus according to any one of (15) to (24), further including:

a wireless communication controlling section configured to individually manage, based on information that specifies a wireless network to which a transmission source of the reception frame belongs and information indicative of a duration of the reception frame, both included in the midamble of the reception frame, a communication situation of a wireless network to which the wireless communication apparatus belongs and a communication situation of a wireless network different from the wireless network to which the wireless communication apparatus belongs.

(26)

A wireless communication method, including the steps of:

receiving a reception frame that includes a preamble deployed at a top of the reception frame and including header information and a midamble deployed in a middle of the frame and including information of at least part of the header information; and detecting the midamble from the reception frame and extracting the information of the at least part of the header information included in the midamble.

(27)

A program for causing a computer to execute a process including the steps of:

receiving a reception frame that includes a preamble deployed at a top of the reception frame and including header information and a midamble deployed in a middle of the frame and including information of at least part of the header information; and detecting the midamble from the reception frame and extracting the information of the at least part of the header information included in the midamble.

(28)

A wireless communication system including a first wireless communication apparatus configured to transmit a transmission frame and a second wireless communication apparatus configured to receive the transmission frame, in which the first wireless communication apparatus includes a preamble generation section configured to generate a preamble that is to be deployed at a top of the transmission frame and includes header information, a midamble generation section configured to generate a midamble that is to be deployed in a middle of the transmission frame and includes information of at least part of the header information, and a wireless transmission processing section configured to transmit the transmission frame including the preamble and the midamble, and the second wireless communication apparatus includes a wireless reception processing section configured to receive the transmission frame, and a midamble detection section configured to detect the midamble from the transmission frame and extract the information of the at least part of the header information included in the midamble.

REFERENCE SIGNS LIST

11 Wireless communication apparatus, 53 Network management section, 54 Transmission frame construction section, 55 Wireless communication controlling section, 56 Header information generation section, 57 Midamble generation section, 58 Transmission power controlling section, 59 Wireless transmission processing section, 62 Wireless reception processing section, 64 Midamble detection section, 65 Header information analysis section, 66 Reception data construction section

The invention claimed is:

1. A wireless communication apparatus, comprising:
circuitry configured to
generate a preamble that is to be deployed at a top of a transmission frame and includes header information;
generate a midamble that is to be deployed in a middle of the transmission frame and includes information of at least part of the header information;
set a transmission power value based on reception power of a received signal from an overlap basic service set (OBSS) indicated by information of a reception electric field strength in association with advanced space reuse; and
transmit the transmission frame including at least one of the preamble and the midamble based on the transmission power value.

2. The wireless communication apparatus according to claim 1, wherein
the midamble includes a training field of at least part of fields included in the preamble other than the header information.

3. The wireless communication apparatus according to claim 2, wherein
the deployment in the midamble and the deployment in the preamble of the field that is included in common in the midamble and the preamble are same as each other.

4. The wireless communication apparatus according to claim 2, wherein
the deployment in the midamble and the deployment in the preamble of the field that is included in common in the midamble and the preamble are different from each other.

5. The wireless communication apparatus according to claim 1, wherein
the midamble is deployed at each of intervals of a data unit included in the transmission frame.

6. The wireless communication apparatus according to claim 5, wherein,
in a case where the data unit has a variable length, delimiter information indicative of an information length of the data unit is deployed immediately preceding to the data unit in the data unit in the transmission.

7. The wireless communication apparatus according to claim 1, wherein
the midamble includes at least any one of information indicative of the transmission power value of the transmission frame, information for advanced space reuse, information for specifying a wireless network to which the wireless communication apparatus belongs, encoding scheme information of the transmission frame, or information indicative of a duration of the transmission frame.

8. The wireless communication apparatus according to claim 1, wherein the circuitry is configured to set the transmission power value within a range of transmission power to transmit the transmission frame by transmission power restriction in a basic service set (BSS) of the wireless communication apparatus, in a case that a signal level of the reception power from the OBSS existing in neighborhood is detected, under applying the advanced space reuse.

9. The wireless communication apparatus according to claim 8, wherein the circuitry is configured to set the transmission power value so that the transmission frame does not collide with other transmission frame of the OBSS.

10. A wireless communication method, comprising the steps of:
generating a preamble that is to be deployed at a top of a transmission frame and includes header information;
generating a midamble that is to be deployed in a middle of the transmission frame and includes information of at least part of the header information;
setting a transmission power value based on reception power of a received signal from an overlap basic service set (OBSS) indicated by information of a reception electric field strength in association with advanced space reuse; and
transmitting the transmission frame including at least one of the preamble and the midamble based on the transmission power value.

11. A wireless communication apparatus, comprising:
circuitry configured to
receive a reception frame that includes at least one of a preamble deployed at a top of the reception frame and including header information and a midamble deployed in a middle of the frame and including information of at least part of the header information, the reception frame being transmitted based on a transmission power value which is set based on reception power of a received signal from an overlap basic service set (OBSS) indicated by information of a reception electric field strength in association with advanced space reuse; and
detect the midamble from the reception frame and extract the information of the at least part of the header information included in the midamble.

12. The wireless communication apparatus according to claim 11, wherein
the midamble includes a training field of at least part of fields included in the preamble other than the header information.

13. The wireless communication apparatus according to claim 12, wherein
the deployment in the midamble and the deployment in the preamble of the field that is included in common in the midamble and the preamble are same as each other.

14. The wireless communication apparatus according to claim 12, wherein
the deployment in the midamble and the deployment in the preamble of the field that is included in common in the midamble and the preamble are different from each other.

15. The wireless communication apparatus according to claim 11, wherein
the midamble is deployed at each of intervals of a data unit included in the reception frame.

16. The wireless communication apparatus according to claim 15, wherein,
in a case where the data unit has a variable length, delimiter information indicative of an information length of the data unit is deployed immediately preceding to the data unit in the reception frame.

17. The wireless communication apparatus according to claim 11, wherein
the midamble includes at least any one of information indicative of the transmission power value of the reception frame, information for advanced space reuse, information for specifying a wireless network to which a transmission source of the reception frame belongs, encoding scheme information of the reception frame, or information indicative of a duration of the reception frame.

18. The wireless communication apparatus according to claim 11, wherein
the circuitry is configured to detect the reception power of the reception frame, and
the circuitry is configured to transmit the detected reception power of the reception frame to other wireless communication apparatus.

19. The wireless communication apparatus according to claim 11, wherein the circuitry is further configured to
manage, based on information that specifies a wireless network to which a transmission source of the reception frame belongs and information indicative of a duration of the reception frame, both included in the midamble of the reception frame, a communication situation of a wireless network to which the wireless communication apparatus belongs and a communication situation of a wireless network different from the wireless network to which the wireless communication apparatus belongs.

20. A wireless communication method, comprising:
receiving a reception frame that includes at least one of a preamble deployed at a top of the reception frame and including header information and a midamble deployed in a middle of the frame and including information of at least part of the header information, the reception frame being transmitted based on a transmission power value which is set based on reception power of a received signal from an overlap basic service set (OBSS) indicated by information of a reception electric field strength in association with advanced space reuse; and
detecting the midamble from the reception frame and extracting the information of the at least part of the header information included in the midamble.

* * * * *